US009483438B2

(12) United States Patent
Reid et al.

(10) Patent No.: US 9,483,438 B2
(45) Date of Patent: Nov. 1, 2016

(54) APPARATUS AND METHOD FOR CONTROLLING THE NUMBER OF VECTOR ELEMENTS WRITTEN TO A DATA STORE WHILE PERFORMING SPECULATIVE VECTOR WRITE OPERATIONS

(71) Applicant: ARM LIMITED, Cambridge (GB)

(72) Inventors: Alastair David Reid, Fulbourn (GB); Daniel Kershaw, Gratkorn (AT)

(73) Assignee: ARM Limited, Cambridge (GB)

( * ) Notice: Subject to any disclaimer, the term of this patent is extended or adjusted under 35 U.S.C. 154(b) by 235 days.

(21) Appl. No.: 14/462,194

(22) Filed: Aug. 18, 2014

(65) Prior Publication Data
US 2015/0100754 A1 Apr. 9, 2015

(30) Foreign Application Priority Data
Oct. 9, 2013 (GB) .................................... 1317874.4

(51) Int. Cl.
*G06F 9/38* (2006.01)
*G06F 15/78* (2006.01)
*G06F 9/30* (2006.01)

(52) U.S. Cl.
CPC ....... *G06F 15/7867* (2013.01); *G06F 9/30036* (2013.01); *G06F 9/30043* (2013.01); *G06F 9/30087* (2013.01); *G06F 9/30098* (2013.01);
(Continued)

(58) Field of Classification Search
None
See application file for complete search history.

(56) References Cited

U.S. PATENT DOCUMENTS 7,395,419 B1 7/2008 Gonion
7,395,496 B2 7/2008 Peretz et al.
(Continued)

FOREIGN PATENT DOCUMENTS

WO 02/084451 10/2002
WO 2013/095608 6/2013

OTHER PUBLICATIONS

U.S. Appl. No. 14/461,664, filed Aug. 18, 2014, Reid et al.
(Continued)

*Primary Examiner* — Jacob A Petranek
(74) *Attorney, Agent, or Firm* — Nixon & Vanderhye P.C.

(57) ABSTRACT

A data processing apparatus and method for performing speculative vector access operations are provided. The data processing apparatus has a reconfigurable buffer accessible to vector data access circuitry and comprising a storage array for storing up to M vectors of N vectors elements. The vector data access circuitry performs speculative data write operations in order to cause vector elements from selected vector operands in a vector register bank to be stored into the reconfigurable buffer. On occurrence of a commit condition, the vector elements currently stored in the reconfigurable buffer are then written to a data store. Speculation control circuitry maintains a speculation width indication indicating the number of vector elements of each selected vector operand stored in the reconfigurable buffer. The speculation width indication is initialized to an initial value, but on detection of an overflow condition within the reconfigurable buffer the speculation width indication is modified to reduce the number of vector elements of each selected vector operand stored in the reconfigurable buffer. The reconfigurable buffer then responds to a change in the speculation width indication by reconfiguring the storage array to increase the number of vectors M and reduce the number of vector elements N per vector. This provides an efficient mechanism for supporting performance of speculative data write operations.

29 Claims, 20 Drawing Sheets

(52) U.S. Cl.
CPC ......... *G06F 9/30109* (2013.01); *G06F 9/3824* (2013.01); *G06F 9/3834* (2013.01); *G06F 9/3838* (2013.01); *G06F 9/3842* (2013.01); *G06F 9/3859* (2013.01); *G06F 9/3875* (2013.01)

(56) References Cited

U.S. PATENT DOCUMENTS

| | | | |
|---|---|---|---|
| 7,606,979 | B1 | 10/2009 | Rozas et al. |
| 7,739,456 | B1 | 6/2010 | Cypher et al. |
| 8,572,341 | B2 * | 10/2013 | Blundell ............... G06F 9/3842 711/163 |
| 2004/0215941 | A1 * | 10/2004 | Thimmannagari . G06F 9/30043 712/228 |
| 2005/0204119 | A1 | 9/2005 | Saha |
| 2006/0259737 | A1 | 11/2006 | Sachs et al. |
| 2008/0288744 | A1 | 11/2008 | Gonion et al. |
| 2008/0288745 | A1 | 11/2008 | Gonion et al. |
| 2008/0288754 | A1 | 11/2008 | Gonion et al. |
| 2008/0288759 | A1 | 11/2008 | Gonion et al. |
| 2009/0288075 | A1 | 11/2009 | Song et al. |
| 2012/0131309 | A1 * | 5/2012 | Johnson ................ G06F 9/30 712/41 |
| 2013/0262833 | A1 | 10/2013 | Gonion |
| 2014/0189321 | A1 * | 7/2014 | Uliel ................... G06F 9/30018 712/222 |

OTHER PUBLICATIONS

International Search Report and Written Opinion of the International Searching Authority dated Dec. 12, 2014 in PCT/GB2014/052508, 13 pages.
R. Kumar et al, "Dynamic Selective Devectorization for Efficient Power Gating of SIMD units in a HW/SW Co-designed Environment" 25$^{th}$ International Symposium on Computer Architecture and High Performance Computing, Oct. 2013, pp. 81-88.
J.L. Hennessy et al "Computer Architecture—A Quantitative Approach" 4$^{th}$ Edition, Appendix F (K. Asanovic), 2007, 62 pages.
International Search Report and Written Opinion of the International Searching Authority dated Dec. 23, 2014 in PCT/GB2014/052507, 8 pages.
Search Report for GB1317876.9 dated Feb. 24, 2014, 1 pg.
Ciricescu et al., "The Reconfigurable Streaming Vector Processor (RSVP™)", *IEEE Computer Society—Micro-36*, 2003, 10 pgs.
Espasa et al., "Quantitative Analysis of Vector Code", *Universitat Politecnica de Catalunya*, No Date, 12 pgs.
Gebis et al., "Embracing and Extending 20$^{th}$-Century Instruction Set Architectures", *IEEE Computer Society*, Apr. 2007, pp. 68-75.
Gee et al., "The Performance Impact of Vector Processor Caches", *Computer Science Division—University of California*, Dec. 1990, 24 pgs.
Espasa et al., "Vector Architectures: Past, Present and Future", *Universitat Politecnica de Catalunya*, No Date, 8 pgs.
D. Martin, Vector Extensions to the MIPS-IV Instruction Set Architecture (V-IRAM Architecture Manual) Revision 3.7.5, No Date, 304 pgs.
C. Kozyrakis, "Scalable Vector Media-processors for Embedded Systems", *Computer Science Division—University of California*, May 2002, 150 pgs.
R. Russell, "The CRAY-1 Computer System", *Communications of the ACM*, vol. 21, No. 1, Jan. 1978, pp. 63-72.
Espasa et al., "Out-of-Order Vector Architectures", *Universitat Politecnica de Catalunya*, No Date, 11 pgs.
Smith et al., "Vector Instruction Set Support for Conditional Operations", *ISCA '00*, 2000, pp. 260-269.
Pajuelo et al., "Speculative Dynamic Vectorization", *ISCA 02*, 2002, 10 pgs.
K. Asanovic, "Vector Microprocessors", *Dissertation—University of California*, 1998, 268 pgs.
Kozyrakis et al., "Vector Vs. Superscalar and VLIW Architectures for Embedded Multimedia Benchmarks", *IEEE*, 2002, pp. 283-293.
Sujon et al., "Vectorization Past Dependent Branches Through Speculation", *IEEE*, 2013, pp. 353-362.
J. Yu, "Vector Processing as a Soft-CPU Accelerator", *Thesis—Simon Frasier University*, 2005, 127 pgs.
Office Action mailed Jul. 6, 2016 in co-pending U.S. Appl. No. 14/461,664 23 pages.

* cited by examiner

SCALAR
DO WHILE LOOP

VECTORIZE

VSTR 1 (SPECULATION WIDTH)
VSTR 2 (SPECULATION WIDTH)
  ⋮
VSTR M (SPECULATION WIDTH)
CONDITION TEST/COMMIT
SET MASK
VSTR M+1 (MASK)
  ⋮
VSTR N (MASK)
CONDITIONAL EXIT

LOOP:         SPECULATE

SERIES OF INSTRUCTIONS WITH SPECULATED WIDTH INCLUDING STORE INSTRUCTIONS WHICH WRITE TO BUFFER

ONE OF MORE INSTRUCTIONS TO DETERMINE APPROPRIATE WIDTH TO COMMIT

COMMIT

SERIES OF NON-SPECULATIVE INSTRUCTIONS

BRANCH <COND> LOOP

EXIT:

COMMIT

START SPECULATION

CONTENTS OF BUFFER
WITH READ EXTENSION

APPARATUS AND METHOD FOR CONTROLLING THE NUMBER OF VECTOR ELEMENTS WRITTEN TO A DATA STORE WHILE PERFORMING SPECULATIVE VECTOR WRITE OPERATIONS

This application claims priority to GB Patent Application No. 1317874.4 filed 9 Oct. 2013, the entire content of which is hereby incorporated by reference.

BACKGROUND OF THE INVENTION

1. Field of the Invention

The present invention relates to a data processing apparatus and method for performing speculative vector access operations.

2. Description of the Prior Art

One known technique for improving performance of a data processing apparatus is to provide circuitry to support execution of vector operations. Vector operations are performed on at least one vector operand, where each vector operand comprises a plurality of vector elements. Performance of the vector operation then involves applying an operation repetitively across the various vector elements within the vector operand(s).

In typical data processing systems that support performance of vector operations, a vector register bank will be provided for storing the vector operands. Hence, by way of example, each vector register within a vector register bank may store a vector operand comprising a plurality of vector elements.

In high performance implementations, it is also known to provide vector processing circuitry (often referred to as SIMD (Single Instruction Multiple Data) processing circuitry) which can perform the required operation in parallel on the various vector elements within the vector operands. In an alternative embodiment, scalar processing circuitry can still be used to implement the vector operation, but in this instance the vector operation is implemented by iterative execution of an operation through the scalar processing circuitry, with each iteration operating on different vector elements of the vector operands.

Through the use of vector operations, significant performance benefits can be realised when compared with the performance of an equivalent series of scalar operations.

One type of vector operation is a vector access operation, which may take the form of a vector load operation used to load at least one vector operand from cache/memory into the vector register bank, or a vector store operation used to store at least one vector operand from the vector register bank into the cache/memory (the cache/memory also being referred to herein as a data store).

When seeking to gain the performance benefits of vector processing, it is known to seek to vectorise a series of scalar operations in order to replace them with an equivalent series of vector operations. For example, for a loop containing a series of scalar instructions, it may be possible to vectorise that loop by replacing the series of scalar instructions with an equivalent series of vector instructions, with the vector operands containing, as vector elements, elements relating to different iterations of the original scalar loop.

However, whilst such an approach can work well when the number of iterations required through the original scalar loop is predetermined, it is more difficult to vectorise such loops when the number of iterations is not predetermined. In particular, since the number of iterations is not predetermined, it cannot be predetermined how many vector elements will be required in each vector operand.

In some situations of the above type, it is possible to perform speculative vector processing, where a speculation is made as to the required number of vector elements, and remedial action is taken later when the exact number of vector elements required is determined. Considering the earlier mentioned vector access operations, it is known to perform such speculation in association with vector load operations, since if an over speculation is made, this will merely result in data being stored in the vector register bank that can later be deleted as part of the remedial action when the exact number of vector elements required is determined. However, for vector store operations, such speculation is problematic, since vector store operations cause the contents of cache/memory to be updated, which may prevent required remedial action being taken.

The Ph.D. thesis entitled "Vector Microprocessors" by K Asanovic, Berkeley, 1998, pp. 116-121, teaches that one limited approach to providing speculative memory loads is to provide a read-ahead buffer area after every memory segment. This read ahead would guarantee that reads to some region after a valid pointer would not cause address errors. However this software technique approach only provides speculation for unit-stride and small stride memory loads and so it is not suitable for use when vectorizing programs with more complex memory access patterns. Further it does not enable speculative vector store operations to be performed.

Accordingly, when loops of scalar instructions include one or more store instructions, and the number of iterations of the loop is not predetermined, it has traditionally been considered that such loops cannot be subjected to speculative vectorisation.

SUMMARY OF THE INVENTION

Viewed from a first aspect, the present invention provides a data processing apparatus comprising: a vector register bank configured to store vector operands for access by processing circuitry, each vector operand comprising a plurality of vector elements; vector data access circuitry for performing vector access operations in order to move vector operands between the vector register bank and a data store; a reconfigurable buffer accessible to the vector data access circuitry and comprising a storage array for storing up to M vectors of N vector elements, where the values of M and N are reconfigurable; the vector data access circuitry being configured to perform speculative data write operations in order to cause vector elements from selected vector operands in the vector register bank to be stored into said reconfigurable buffer, on occurrence of a commit condition, the vector data access circuitry further being configured to cause the vector elements currently stored in the reconfigurable buffer to be written to the data store; speculation control circuitry configured to maintain a speculation width indication indicating the number of vector elements of each selected vector operand stored in the reconfigurable buffer, the speculation width indication being initialised to an initial value, and on detection of an overflow condition within the reconfigurable buffer the speculation width indication being modified to reduce the number of vector elements of each selected vector operand stored in the reconfigurable buffer; and the reconfigurable buffer being responsive to a change in the speculation width indication to reconfigure the storage array to increase the number of vectors M and reduce the number of vector elements N per vector.

In accordance with the present invention, a reconfigurable buffer is provided comprising a storage array for storing up to M vectors of N vector elements, where the values of M and N are reconfigurable. Vector data access circuitry can then be arranged to perform speculative data write operations, where instead of writing the data directly to the data store, the relevant vector elements are stored into the reconfigurable buffer. Then, subsequent occurrence of a commit condition causes the vector data access circuitry to store the vector elements currently stored in the reconfigurable buffer out to the data store. Further, a speculation width indication is maintained to indicate the number of vector elements of each vector operand that is stored in the reconfigurable buffer. The speculation width indication is initialised to an initial value, for example a value indicating a maximum number of vector elements to be stored (this hence identifying the maximum value of N, and thus a minimum value of M). On detection of an overflow condition, speculation control circuitry is then used to modify the speculation width indication in order to reduce the number of vector elements stored in the reconfigurable buffer (i.e. to reduce the value of N). The reconfigurable buffer then reconfigures the storage array in order to increase the number of vectors M and reduce the number of vector elements N per vector, based on the revised speculation width.

By such an approach, it is possible to vectorise sequences of scalar instructions that include one or more store instructions, and allow for speculative execution of the resultant vector operations. In particular, when speculative data write operations (also referred to herein as speculative store instructions) are executed, the relevant vector elements are first stored into the reconfigurable buffer and only sent to the data store following occurrence of the commit condition, hence ensuring that the state of the data store is not updated until the commit condition has occurred. Typically, by the time the commit condition occurs, a determination will have been made as to the appropriate speculation width, and hence the appropriate number of vector elements to store out to the data store.

Further, in accordance with the present invention, if prior to occurrence of the commit condition, the reconfigurable buffer reaches a point where it can no longer store a further vector of vector elements, having regards to the current speculation width indication (such a situation being referred to herein as an overflow condition), then the speculation width is reduced, and the reconfigurable buffer reconfigured accordingly so as to allow more vectors to be stored within the reconfigurable buffer, each vector having a smaller number of vector elements. This allows the speculation width to be reduced dynamically during performance of the speculative data write operations whilst maintaining vector elements within the reconfigurable buffer that then can be written to the data store on occurrence of the commit condition.

The speculation width indication can take a variety of forms. For example, the speculation width indication can be specified by a mask or by the contents of one or more registers identifying particular element positions, for example a start element position and/or an end element position. In one embodiment, the speculation width indication indicates not only the number of vector elements of each vector operand to be subjected to the speculative data write operations, but further identifies a first vector element of each vector operand to be subjected to said speculative data write operations. The first vector element identified in such a manner need not be the vector element at element position 0 of the vector operand.

Whilst the number of vector elements to be subjected to the speculative data write operations need not occupy a series of adjacent vector element positions, in one embodiment the speculation width indication does identify the number of vector elements of each vector operand to be subjected to said speculative data write operations as being a specified number of sequential vector elements starting from said first vector element.

Accordingly the first vector element stored in the reconfigurable buffer will not necessarily be the vector element at element position 0 of the vector operand.

There are a number of ways in which the vector data access circuitry can be arranged to perform speculative data write operations. For example, specific speculative data write instructions may be provided that cause the vector data access circuitry to perform speculative data write operations. Alternatively, or in addition, in one embodiment the speculation control circuitry is responsive to execution of a start speculation instruction to trigger a speculative mode of operation during which the vector data access circuitry is configured to perform said speculative data write operations. Hence, in such embodiments, the apparatus is placed in a speculative mode of operation during which speculative data write operations are performed.

There are a number of ways in which the commit condition can be triggered. In one embodiment, the speculation control circuitry is responsive to execution of a commit instruction to indicate the occurrence of the commit condition to the vector data access circuitry and to terminate speculation. In embodiments where a speculative mode of operation is used, then execution of the commit instruction will typically terminate the speculation by causing the apparatus to exit the speculative mode of operation.

The speculation width indication can be caused to be initialised to the initial value in a variety of ways. In embodiments where the above-mentioned start speculation instruction and commit instructions are used, one of those instructions will typically be used to initialise the speculation width indication.

In one embodiment, the speculation control circuitry will respond to repeat occurrences of the overflow condition to further reduce the speculation width. However, in one embodiment, if the speculation control circuitry is responsive to the overflow condition to modify the speculation width indication to indicate that only one vector element of each selected vector operand is to be stored in the reconfigurable buffer, the speculation control circuitry is configured to cause the vector data access circuitry to write to the data store the first vector element of each vector currently stored in the reconfigurable buffer. Such an approach avoids a potential situation arising where the reconfigurable buffer could overflow even with vectors containing only one vector element. Instead, all of the pending writes are performed in order, i.e. the first elements of each vector are written to memory, thereby causing the buffer to be drained, hence avoiding the possibility of the reconfigurable buffer overflowing once the speculation width has been reduced to one vector element. Thereafter, all subsequent speculative write operations occurring prior to the commit condition can in one embodiment continue to be written into the reconfigurable buffer, since the draining of the current contents of the reconfigurable buffer will ensure there is space for these future writes.

Alternatively, in one embodiment, once the speculation width has been reduced to one vector element, the speculation control circuitry is configured to terminate speculation. As a result, any subsequent data write operations occurring prior to the commit condition will not be treated as speculative, and instead the first data element of each of those write operations will be written to the data store rather than into the reconfigurable buffer. This means that the writes will occur before the commit condition, but this is not problematic since at this stage the speculation width has been reduced to one vector element, and it is always safe to write the first vector element out to the data store, since effectively this is the situation where no speculation is being performed.

In one embodiment, for each speculative data write operation (irrespective of the current speculation width indication), the first vector element of each selected vector operand is written to the data store rather than to the reconfigurable buffer, and any remaining vector elements indicated by the speculation width indication are stored into the reconfigurable buffer. Since it will always be safe to write the first vector element to the data store, such an approach will still ensure correct operation, and allows the storage needed to store the first vector element of each vector to be omitted from the reconfigurable buffer. This hence enables the size of the reconfigurable buffer to be reduced.

The manner in which the speculation control circuitry is configured to modify the speculation width indication upon occurrence of an overflow condition can vary dependent on implementation. However, in one embodiment, each time the overflow condition is detected the speculation control circuitry is configured to modify the speculation width indication in order to reduce the number of vector elements N per vector by a factor of two. Such an approach can simplify the reconfiguration operation of the reconfigurable buffer.

In one embodiment, the reconfigurable buffer is arranged, on reconfiguring the storage array in response to a modified speculation width indication, to discard any vector elements in the reconfigurable buffer that lie outside the number of vector elements indicated by the modified speculation width. This is not problematic, since the discarded vector elements relate to a higher level of speculation, and the software executing on the data processing apparatus can be arranged to seek to write those discarded vector elements during a subsequent series of speculative data write operations.

In one embodiment, in addition to performing speculative data write operations, the vector data access circuitry is further configured to perform speculative data read operations in order to cause vector elements of selected vector operands to be read from said data store for storage in said vector register bank, the number of vector elements of each selected vector operand being dependent on said speculation width indication. Hence, as with speculative data write operations, the speculation width indication is used to control the number of vector elements within each vector operand subjected to speculative data read operations.

Whilst the vector elements read by the speculative data read operations can be stored directly into the vector register bank, when performing both speculative data write operations and speculative data read operations, there may be a need to check any hazards between the reads and writes performed. For example, if an earlier data write operation has written a data value to a particular address, but that data value is still held within the reconfigurable buffer, and hence has not been written to the data store, a subsequent read operation seeking to read from the data store will obtain the wrong value if it obtains the value directly from the data store before the contents of the reconfigurable buffer have been written out to the data store.

In one embodiment, the provision of such hazard checking is implemented through a modification to the reconfigurable buffer. In particular, in one embodiment, the reconfigurable buffer is configured to store, for each speculative data write operation performed, the vector elements forming a write vector to be written and address indication data used to determine an address of each of said vector elements of the write vector, the reconfigurable buffer further being configured to store, for each speculative data read operation, address indication data used to identify an address for each vector element forming a read vector to be read by that speculative data read operation. Hence, for speculative write operations, both the vector elements forming the write vector and associated address indication data are stored into the reconfigurable buffer. For each speculative read operation, the read data does not need to be stored, but the address indication data associated with the vector elements being read is stored within the reconfigurable buffer. This provides a repository of address information which can be used to perform hazard checking. The address indication data can take a variety of forms, for example it may be "unit strided" representing a sequence of consecutive addresses (or a contiguous region of memory), may be "strided" representing a sequence of evenly spaced addresses, or may be "indexed" represented by a vector of addresses, one per vector element.

In particular, in one embodiment, each write vector each write vector and each read vector comprise element positions from an initial start position K to a position X, where K and X are dependent on the speculation width indication, and the apparatus further comprises address comparison circuitry configured to determine whether an address of a first vector element associated with a current speculative data access operation matches an address of a second vector element associated with address indication data stored in the reconfigurable buffer. In the event of said match being determined, and if at least one of the first vector element and the second vector element forms part of a write vector, and the second vector element is at a higher element position than the first vector element, the speculation control circuitry is configured to modify the speculation width indication to reduce the number of vector elements in each write vector and each read vector.

Hence, in accordance with this approach, address comparison circuitry checks for potential hazard conditions, and then the hazard condition is removed by reducing the speculation width.

There are a number of ways in which the speculation width can be reduced in order to remove the potential read-after-write (RAW), write-after-read (WAR) and write-after-write (WAW) hazards. In one embodiment, if the second vector element is at element position j between element positions K and X, the speculation control circuitry is configured to modify the speculation width indication to reduce the number of vector elements in each write vector and each read vector to include vector element positions K to j-1. Reducing the speculation width to only include vector element positions K to j-1 causes the vector element at element position j to be discarded, hence removing the identified hazard.

Hence, in accordance with the above described technique, the address of each vector element associated with a current speculative data access operation is compared with the address of each vector element of a preceding read or write operation identified by the address indication data in the buffer, if that latter vector element is in an element position greater than the position of the new vector element (i.e. the vector element of the current speculative data access operation). It should be noted that if the current speculative data access operation is a speculative data read operation, it is not necessary to compare the address of each vector element of the current speculative data read operation with any addresses relating to read vectors identified in the reconfigurable buffer.

It is possible that the above described address comparison process may result in multiple matches. In one embodiment, in the event of the address comparison circuitry determining that the address of a first vector element within a current speculative data access operation matches the address of multiple second vector elements associated with address indication data stored in the reconfigurable buffer, the address comparison circuitry is configured to determine as a matching second vector element the second vector element amongst said multiple second vector elements having the lowest element position, and the speculation control circuitry is configured to modify the speculation width indication having regard to the element position of the matching second vector element. Hence, the speculation width is reduced having regards to the matching vector element at the lowest element position, thereby removing all the potential hazards identified by the multiple matches.

In one embodiment, if the current speculative data access operation data is a current speculative data write operation, the address comparison circuitry is configured to compare the address indication data of the current speculative data write operation with each address indication data stored in the reconfigurable buffer in order to detect any matches between the addresses of the vector elements of the current speculative data write operation and the addresses of the vector elements of each write vector and each read vector identified by address indication data stored in the reconfigurable buffer.

However, if the current speculative data access operation is a current speculative data read operation, the address comparison circuitry is configured to compare the address indication data of the current speculative data read operation with the address indication data of each write vector stored in the reconfigurable buffer in order to detect any matches between the addresses of the vector elements of the current speculative data read operation and the addresses of the vector elements of each write vector stored in the reconfigurable buffer.

In addition to supporting detection and elimination of read/write and write/write hazards, the reconfigurable buffer as described earlier can be used to allow for a forwarding of write data to subsequent read operations. In particular, the address comparison circuitry can be configured to determine whether an address of a first vector element associated with a current speculative data read operation matches an address of a third vector element of a write vector stored in the reconfigurable buffer. In the event of said match being determined, and if the third vector element is at a lower element position than the first vector element, or at the same element position as the first vector element, the address comparison circuitry is configured to output from the reconfigurable buffer the third vector element to form the first vector element of the read vector of the current speculative data read operation. This hence identifies situations where a read operation is seeking to read from an address associated with write data that is currently within the reconfigurable buffer, and not yet written to the data store, and ensures that that write data is then returned as the correct read data.

Again, it is possible that such an address comparison process may result in multiple matches. In one embodiment, in the event of the address comparison circuitry determining that the address of a first vector element within a current speculative data read operation matches the address of multiple third vector elements associated with write vectors stored in the reconfigurable buffer, the address comparison circuitry is configured to determine as a matching third vector element the third vector element amongst said multiple third vector elements having the highest element position, and the address comparison circuitry is configured to output from the reconfigurable buffer the matching third vector element to form the first vector element of the read vector of the current speculative data read operation. The matching third vector element at the highest element position will be the most up to date write data, and accordingly is the appropriate write data to return to form the read data of the current speculative data read operation.

In one embodiment, in the presence of more than one of said multiple third vector elements having the highest element position, the address comparison circuitry is configured to determine as said matching third vector element the third vector element amongst said more than one of multiple third vector elements relating to the most recent speculative data write operation. This again ensures that the correct write data is returned to form the read data.

The number of address comparisons that require to be performed by the address comparison circuitry will depend on the size of the reconfigurable buffer, but potentially a significant number of address comparisons need to be performed by the address comparison circuitry. In one embodiment, in order to improve the performance of the address comparison circuitry, the address comparison circuitry comprises a precise comparison section and an approximate comparison section, the approximate comparison section being used for performing comparisons in respect of the addresses of element positions higher than a selected element position. The higher element positions are those with a higher degree of speculation, and by only performing an approximate comparison in relation to those higher element positions, a significant increase in the performance of the address comparison circuitry can be achieved. If the result of the approximate comparison indicates that there may be a match with one of the element positions covered by the approximate comparison, then the precise comparison section may be used in a subsequent iteration to perform a precise comparison, or alternatively the speculation width can be reduced as described earlier in order to remove any potential hazards with addresses of element positions covered by the approximate comparison.

The selected element position above which approximate comparison is performed can be chosen dependent on the situation. For example, if the current speculative data access operation is a data write operation, the selected element position can be any desired position. If the current speculative data access operation is a speculative data read operation, then it may be desirable (unless the speculation width is reduced to remove the RAW hazard) to perform exact comparisons if the earlier mentioned write data forwarding approach is used, and accordingly the choice of the selected element position will depend on the particular element position of the current speculative data read operation being considered at the time.

Various known techniques can be used to form the approximate comparison section. However, in one embodiment, the approximate comparison section comprises Bloom filter circuitry.

Whilst in one embodiment, the address comparison circuitry may be required to perform the above identified address comparisons for all speculative data access operations, in an alternative embodiment the speculative data access operations have a comparison state indication associated therewith, and the address comparisons performed by the address comparison circuitry are dependent on said comparison state indication. A comparison state indication may be set globally or may be identified individually for each speculative data access operation.

In one embodiment, if the comparison state indication has a first value for the current speculative data access operation, the address comparison circuitry is configured to perform no address comparisons for that current speculative data access operation. Hence, if the programmer knows that a vector that is the subject of a speculative vector access operation cannot possibly have a matching address with any of the contents in the reconfigurable buffer, the state information can be set to the first value in order to cause the address comparison circuitry to be bypassed for that particular vector access operation.

Alternatively, if the reads and writes consist of one set A of reads/writes which might match each other, and a second set B of reads/writes that might match each other, then the reconfigurable buffer can maintain a flag in association with each vector to identify whether that vector relates to set A or set B, and then for a current speculative data access operation identified as either being relating to set A or set B, the number of address comparisons can be reduced, in particular the address comparison circuitry only comparing against the relevant vectors within the reconfigurable buffer.

Viewed from a second aspect, the present invention provides a method of performing speculative vector write operations in a data processing apparatus comprising a vector register bank for storing vector operands for access by processing circuitry, each vector operand comprising a plurality of vector elements, and vector data access circuitry for performing vector access operations in order to move vector operands between the vector register bank and a data store, the method comprising: providing a reconfigurable buffer accessible to the vector data access circuitry and comprising a storage array for storing up to M vectors of N vector elements, where the values of M and N are reconfigurable; using the vector data access circuitry to perform speculative data write operations in order to cause vector elements from selected vector operands in the vector register bank to be stored into said reconfigurable buffer; on occurrence of a commit condition, causing the vector elements currently stored in the reconfigurable buffer to be written to the data store; maintaining a speculation width indication indicating the number of vector elements of each selected vector operand stored in the reconfigurable buffer, the speculation width indication being initialised to an initial value; on detection of an overflow condition within the reconfigurable buffer, modifying the speculation width indication to reduce the number of vector elements of each selected vector operand stored in the reconfigurable buffer; and responsive to a change in the speculation width indication, reconfiguring the storage array of the reconfigurable buffer to increase the number of vectors M and reduce the number of vector elements N per vector.

Viewed from a third aspect, the present invention provides a computer program product storing in a non-transitory form a computer program for controlling a computer to provide a virtual machine execution environment for program instructions corresponding to a data processing apparatus in accordance with the first aspect of the present invention.

Viewed from a fourth aspect, the present invention provides a data processing apparatus comprising: vector register bank means for storing vector operands for access by processing means, each vector operand comprising a plurality of vector elements; vector data access means for performing vector access operations in order to move vector operands between the vector register bank means and a data store means; reconfigurable buffer means for access by the vector data access means and comprising a storage array means for storing up to M vectors of N vector elements, where the values of M and N are reconfigurable; the vector data access means for performing speculative data write operations in order to cause vector elements from selected vector operands in the vector register bank means to be stored into said reconfigurable buffer means, on occurrence of a commit condition, the vector data access means for causing the vector elements currently stored in the reconfigurable buffer means to be written to the data store means; speculation control means for maintaining a speculation width indication indicating the number of vector elements of each selected vector operand stored in the reconfigurable buffer means, the speculation width indication being initialised to an initial value, and on detection of an overflow condition within the reconfigurable buffer means the speculation width indication being modified to reduce the number of vector elements of each selected vector operand stored in the reconfigurable buffer means; and the reconfigurable buffer means being responsive to a change in the speculation width indication to reconfigure the storage array means to increase the number of vectors M and reduce the number of vector elements N per vector.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
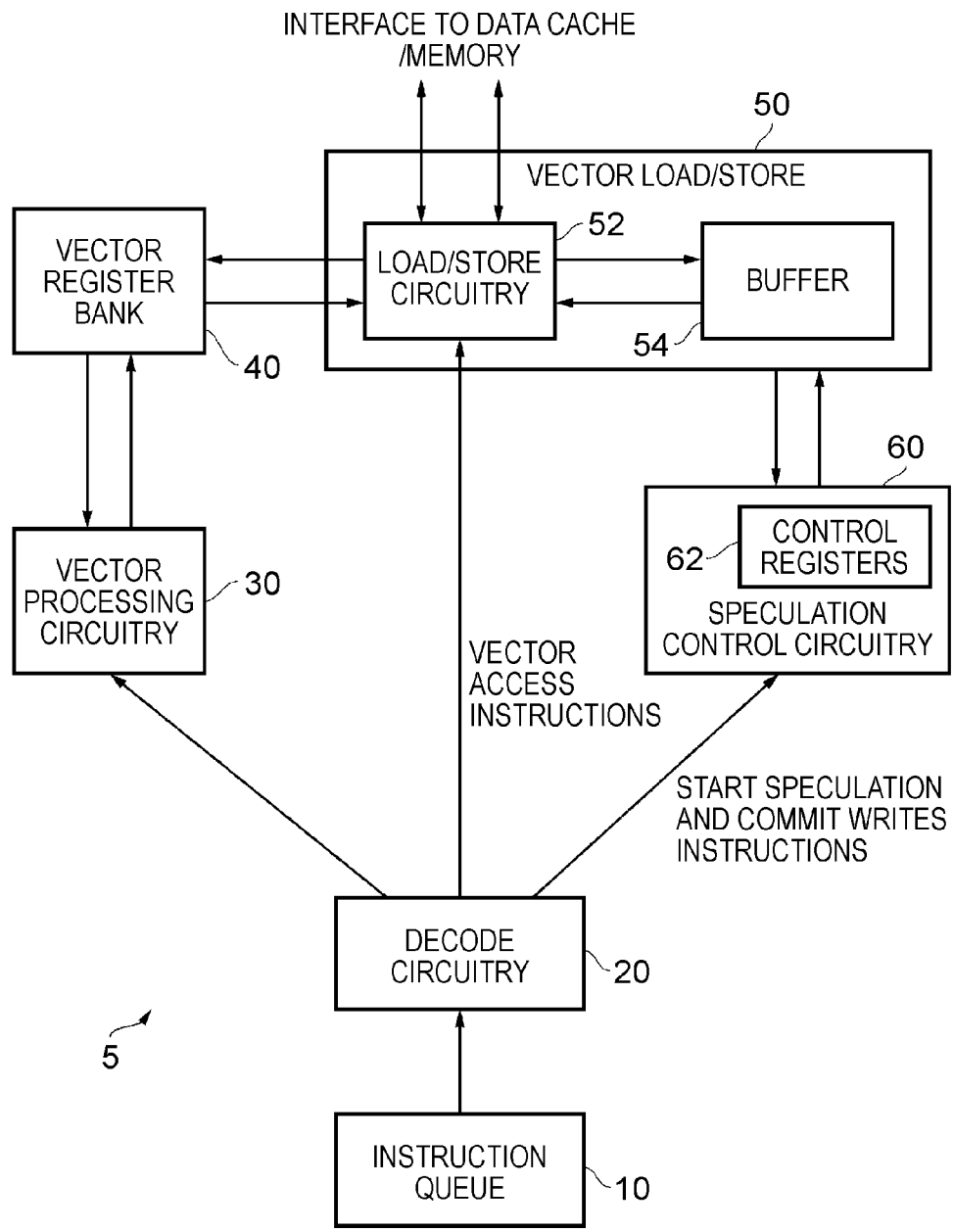
FIG. 1 is a block diagram of a data processing apparatus in accordance with one embodiment.

FIG. 1 shows a portion of a data processing apparatus 5 according to an embodiment. It only shows the vector processing portion and there may also be a scalar processing circuitry, a scalar load/store unit and a scalar register bank, such that both vector and scalar instructions can be decoded and executed.

An instruction queue 10 is provided holding instructions to be executed, these instructions being routed to decode circuitry 20 which is arranged to decode the instructions and send control signals to the appropriate circuits within the apparatus of FIG. 1. In particular, for general vector processing instructions, the decode circuitry 20 will issue control signals to the vector processing circuitry 30, which will perform the required vector processing operations with reference to one or more vector source operands stored within the vector register bank 40. Typically, the results of those operations are also stored back to the vector register bank 40 as one or more vector destination operands.

For any vector data access instructions, decoding of those instructions will cause control signals to be issued to the vector load/store unit 50, which includes load/store circuitry 52 for moving one or more data operands in either direction between the vector register bank and cache/memory (the cache/memory being referred to herein as a data store). In particular, if the vector data access instruction is a vector load instruction, the load/store circuitry 52 will load at least one vector operand from the data store into the vector register bank 40. Similarly, if the vector data access instruction is a vector store instruction, the load/store circuitry 52 will store at least one vector operand from the vector register bank 40 out to the data store.

In accordance with the embodiment illustrated in FIG. 1, the vector load/store unit 50 also incorporates a buffer 54 accessible to the load/store circuitry 52. Whilst in FIG. 1 the buffer 54 is shown internally within the vector load/store 50, it will be appreciated that alternatively the buffer could be provided externally if desired.

In accordance with the described embodiment, the load/store circuitry 52 can be arranged to perform speculative write operations, where instead of the selected operand(s) being stored from the vector register bank directly into the data store, vector elements from the selected operand(s) are instead stored within the buffer 54, and only when a subsequent commit condition is determined, are the current content of the buffer written out to the data store. During speculative data write operations, the speculation control circuitry 60 maintains within control registers 62 a speculation width indication indicating the number of vector elements of each operand to be processed during the speculative write operations. In one embodiment, at the start of speculation, the speculation width is set to some predetermined maximum value. Having regards to the finite size of the buffer 54, this will mean that the buffer 54 has capacity to store a certain number of vectors M, where each vector comprises N vector elements, with the value of N being indicated by the speculation width.

Depending how many speculative write operations are performed prior to the commit condition being detected, it may be that the capacity of the buffer is reached whilst there are still speculative write operations to perform. As will be discussed in more detail later, in accordance with the described embodiment the buffer 54 is reconfigurable, and if it is determined that the buffer 54 does not have space to store subsequent write vectors, the speculation control circuitry 60 is configured to reduce the speculation width indicated by the speculation width indication. As a result, the buffer 54 reconfigures itself so as to reduce the number of active vector elements N per vector, thereby increasing the number of vectors M that can be stored. Any vector elements currently in the buffer that are beyond the new maximum vector element position are discarded. This does not cause any important data to be lost, as at this point the apparatus is working in a speculative mode of operation, and the vector elements at the higher element positions relate to a higher degree of speculation. If that data is discarded at this point, then the software executing on the apparatus can arrange for that data to be stored during a further series of store operations performed after the current series of speculative store operations.

By such an approach, it is possible to support speculative write operations when vectorising code, whilst ensuring that the write data is not committed to the data store until a commit point has been reached. The buffer is reconfigurable, and in combination with the speculative control circuitry this allows the speculation width to be dynamically reduced in order to accommodate at least one vector element from each vector processed by the speculative write operations.

Figure 2A:
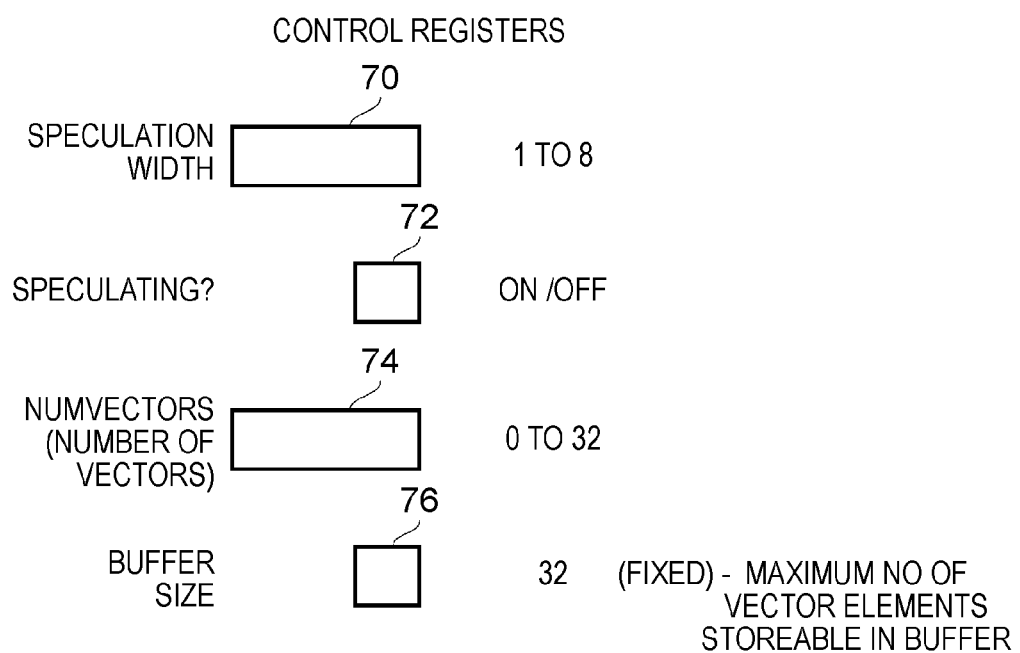
FIGS. 2A to 2C schematically illustrate various control registers provided within the speculation control circuitry of FIG. 1 in accordance with one embodiment.

The control register 62 can take a variety of forms, and FIG. 2A illustrates a number of parameters that can be stored within the control registers. Firstly, a speculation width indication 70 is maintained, and in one embodiment this can take a value between one and eight, indicating that each vector stored within the buffer 54 will contain between one and eight vector elements. In one embodiment, the initial speculation width is set to eight, and then is selectively reduced as and when required, for example due to the overflow condition in the buffer being detected.

In one embodiment, the control registers 62 also include a speculating flag 72, which is set to indicate whether speculation is turned on or not. When speculation is off, the vector write operations are performed non speculatively, and accordingly the data obtained from the vector register bank 40 will be written straight out to the data store. However, when speculation is turned on, as discussed earlier, such data will instead be routed firstly to the buffer 54, and only committed to the data store once a commit point has been reached.

In one embodiment, the control registers 62 also include some additional information. In particular, a numvectors indication 74 is maintained identifying the number of vector stored within the buffer. In one embodiment, the buffer 54 has a capacity allowing it to store up to 4 vectors of 8 vector elements each. Further, the speculation width can be reduced to a minimum of one, at which point there will be 32 vectors, each comprising one vector element. Accordingly, it will be appreciated that the numvectors indication will take a value between 0 and 32 when speculation is turned on.

Further, in one embodiment a buffer size indication 76 is maintained within the control registers 62. Typically this is a fixed value indicative of a maximum number of elements stored within the buffer. Using the above example, it will be appreciated that in that embodiment the buffer size will be 32.

Speculation width indication 70 can be specified in a variety of ways. However, in one embodiment the control registers 65 include both a first element position register 80 and a speculation width register 85. The first element position register 80 identifies the first vector element position of a vector operand to be subjected to the speculative data write operations, whilst the speculation width register 85 then identifies the final vector element position, the speculation width within the vector operand 90 then being indicated by the difference between the contents of these two registers.

During a first iteration of a sequence of speculative data write operations, it may be the case that the first element position register points to the vector element at element position 0 within the vector operand 90, and the speculation width register 85 may, for example, point to the last vector element, hence specifying the entire vector width. During performance of the speculative data write operations, the speculation width register contents may be altered to identify a reduced speculation width. If at the time a commit point is reached, the speculation width has been reduced below the required number of vector elements determined at the commit point, then a subsequent iteration of the data write operations can be performed, and this time the first element position register 80 will be set to identify the first required vector element that has not been processed via the previous iteration of the speculative data write operations. The speculation width register 85 will then be set to identify the required speculation width for the subsequent iteration.

Accordingly it will be appreciated that the first vector element stored within the reconfigurable buffer will be that identified by the contents of the register 80, and not necessarily the first vector element within the relevant vector operand.

Figure 2B:
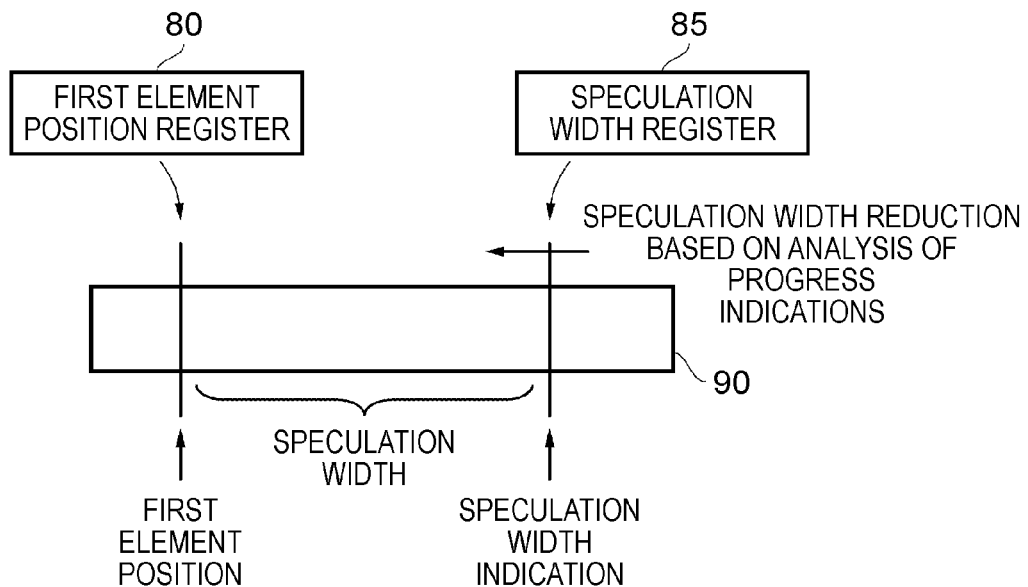
Figure 2C:
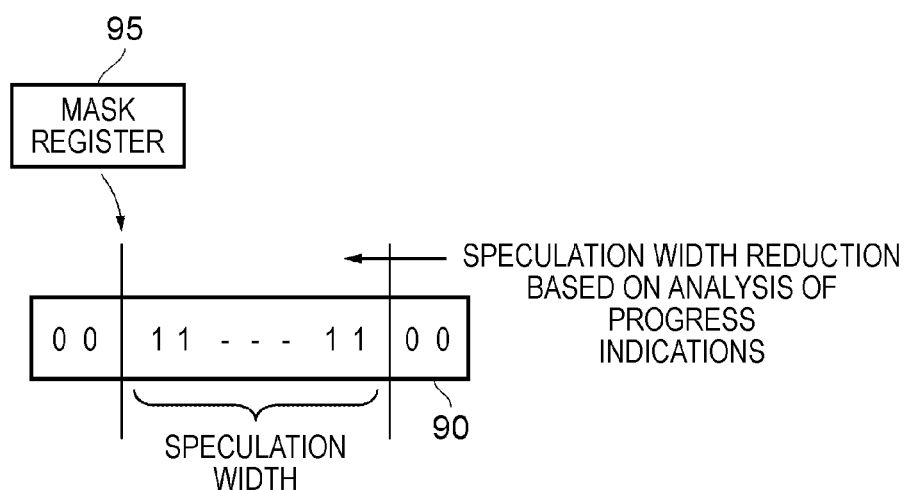

Whilst in the example of FIG. 2B, two separate registers are maintained, in an alternative embodiment, a mask register 95 may be provided to identify the speculation width indication, as shown in FIG. 2C. In particular, the mask may contain a bit for each element position within the vector operand 90, with those bits being set to zero or one to identify the speculation width. In one embodiment, the speculation width will be specified by a series of logic one values contained within the mask, with the contents of that mask being updated during performance of the operations as the speculation width is reduced, by certain of those logic one values being converted into logic zero values to identify the reduced speculation width. It will be appreciated that in alternative embodiments, the meanings ascribed to logic one and logic zero values within the mask may be reversed.

Figure 3:
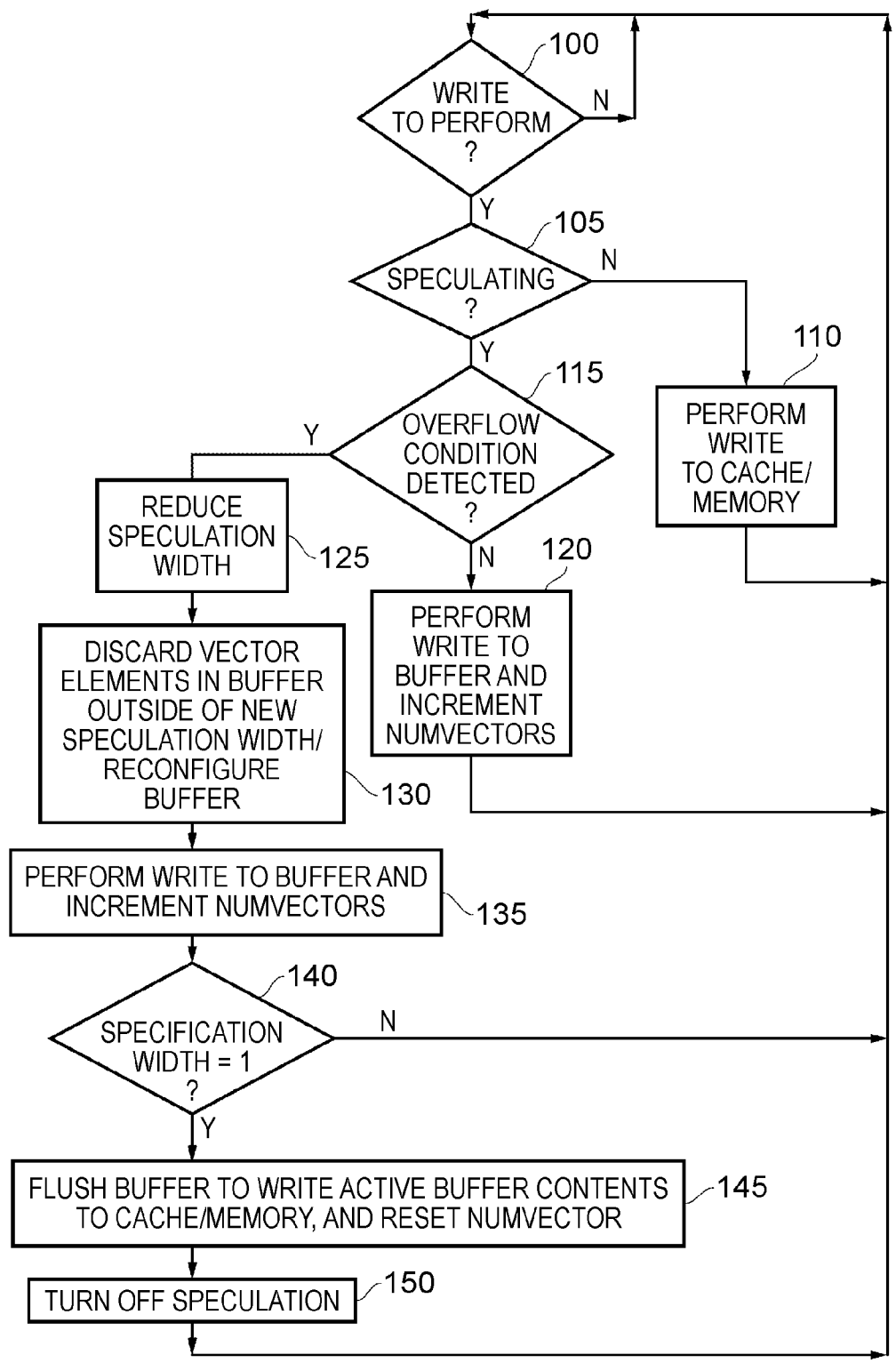
FIG. 3 is a flow diagram illustrating how the circuitry of FIG. 1 is used to perform speculative vector write operations in accordance with one embodiment.

FIG. 3 is a flow diagram illustrating the operation of the circuitry of FIG. 1 when performing write operations. At step 100 it is determined whether there is a write operation to perform, and if so it is then determined at step 105 whether the write operation should be treated as a speculative write operation or not. In one embodiment, this will depend on the state of the speculating flag 72 within the control registers 62. This flag can be set in a variety of ways. For example, in one embodiment a specific start speculation instruction can be used to cause the speculation control circuitry 60 to set the speculating flag 72 within the control register 62. Alternatively, the instruction set may include speculative and non-speculative versions of the write instructions, so that the flag is set dependent on the type of write instruction decoded by the decode circuitry 20.

If it is determined at step 105 that speculation is not to be performed, then the process proceeds to step 110 where the write operation is performed in the standard manner, resulting in data being written out to cache/memory, whereafter the process returns to step 100.

However, if it is determined at step 105 that speculation is turned on, then the process proceeds to step 115, where it is determined whether the overflow condition has been detected. As discussed earlier, this condition will be detected if it is determined that the buffer 54 does not have space to store a write vector for the current write operation, having regards to the current speculation width. If the overflow condition is not detected, then the speculative write is performed at step 120, causing a number of vector elements from a selected vector operand to be written into the buffer 54. At this point, the numvectors indications 74 is incremented to identify that a further vector has been stored within the buffer, whereafter the process returns to step 100.

If the overflow condition is detected at 115, then the process proceeds to step 125, where the speculation width is reduced by the speculation control circuitry 60. There are a number of ways in which the speculation width can be reduced but in one embodiment the speculation control circuitry 60 is configured to reduce the speculation width by powers of 2. It has been found that this approach provides for simpler reconfiguration of the buffer 54. Hence, if the current speculation width is at 8, it will be reduced to 4, if the current speculation width is at 4, it will be reduced to 2, and if the current speculation width is at 2, it will be reduced to 1. As will be discussed later with reference to the remainder of FIG. 3, the speculation width will never be reduced below 1, thereby ensuring some forward progress when performing speculation.

Once the speculation width has been reduced, then at step 130 the buffer 54 discards vector elements in the buffer that are outside of the new speculation width. The buffer is also reconfigured so as to accommodate an increased number of vectors, each of a reduced width.

Then, at step 135, the write operation is performed, during which a number of vector elements of the selected vector operand (the number of vector elements being indicated by the new reduced speculation width) are stored within the buffer 54.

At step 140, it is then determined whether the current speculation width is one. If not, no further action is required and the process returns to step 100. However, if it is determined that the current speculation width is one, then the current contents of the buffer are flushed in order to write the currently active buffer contents out to the cache/memory. At this point, the numvector indication 74 will be reset, since once the buffer has been flushed there will be no active vector elements within the buffer. Following step 145, speculation is then turned off at step 150, the process thereafter returning to step 100.

As a result of turning speculation off, this will mean that any further write operations required prior to the commit point being reached will be treated as non-speculative write operations, and accordingly the path through steps 105 and 110 of FIG. 3 will be followed. Given that the current speculation width will be one, a mask can be set for the non-speculative instructions to ensure that each write operation will cause the first vector element of the selected vector operand to be written out to cache/memory.

It is always safe to write out the first vector element of each speculative write operation, since in effect once the speculation width has been reduced to one, the write operation is no longer speculative.

As an alternative approach to that discussed in FIG. 3, whilst the buffer is being flushed at step 145, it would be possible to process subsequent write operations as being speculative, with the first vector element of each of the identified vector operands being written into the buffer. Provided the buffer is drained at least as quickly as new write operations are performed, and the numvector indication 74 is maintained to identify the total number of active vectors still in the buffer, this would allow speculation to remain turned on until the commit point is reached. It will be appreciated that it would then not be necessary to turn off speculation at step 150, and instead wait for the commit point to be reached before speculation is turned off. The end effect will be the same, in that the first vector element of each vector will be written to the cache/memory.

As another alternative embodiment, when performing any speculative write operations, the load/store circuitry 52 may be arranged so as to directly store the first vector element of each vector operand to the data store, and to then place all of the remaining vector elements (having regards to the currently specified speculation width) into the buffer 54. Since it is always safe to write the first vector element out to the data store, this will still ensure correct operation, and will reduce the size requirements for the buffer 54.

Figure 4:
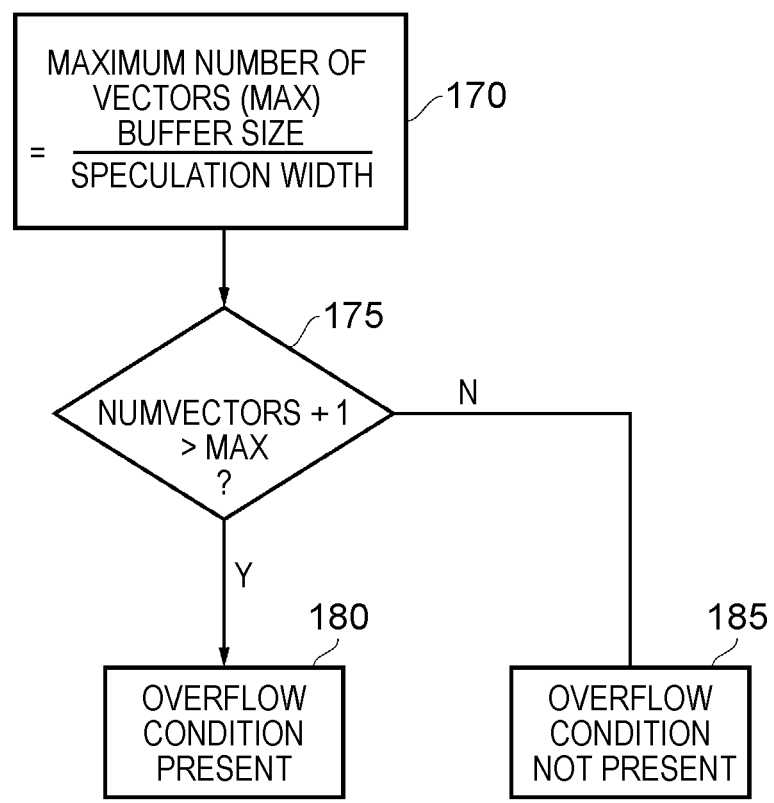
FIG. 4 is a flow diagram illustrating in more detail how the overflow condition is detected when performing the process of FIG. 3, in accordance with one embodiment.

There are a number of ways in which the overflow condition could be detected at step 115 of FIG. 3, and the flow diagram of FIG. 4 illustrates one example approach. At step 170, the maximum number of vectors is determined by dividing the buffer size indication 76 by the speculation width indication 70. Thereafter, it is determined whether the value "numvectors+1" is greater than that maximum number of vectors calculated at step 170. If not, no overflow condition is present (step 185), but if it is then the overflow condition is present (step 180).

Figures 5, 6:
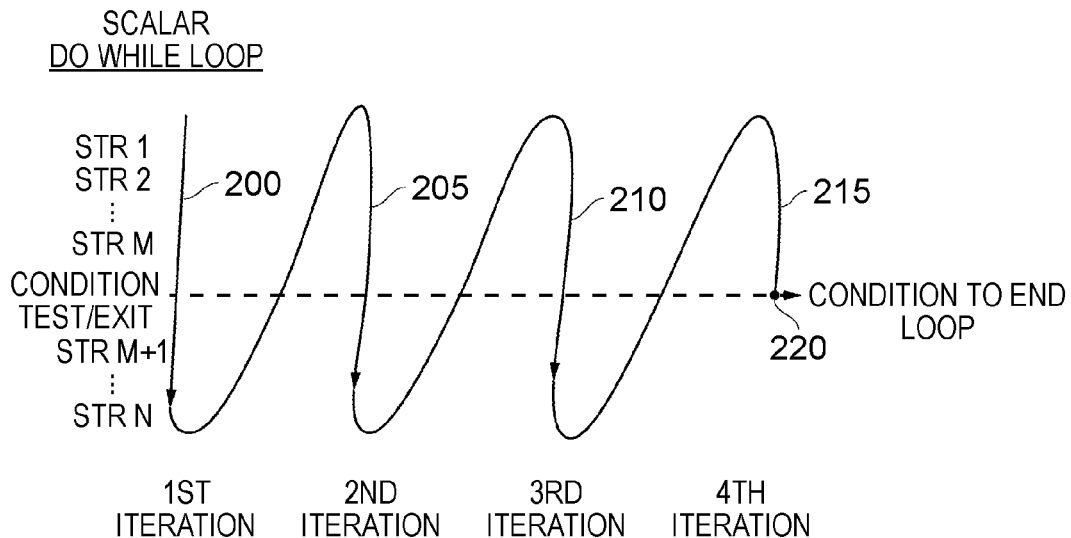
FIG. 5 schematically illustrates a loop of scalar instructions which can be vectorised using the techniques of the described embodiments.
FIGS. 6 and 7 schematically illustrate a sequence of vector instructions used to vectorise the scalar loop of FIG. 5 in accordance with one embodiment.

FIG. 5 schematically illustrates a scalar loop that can be vectorised using the earlier described embodiment. This loop of scalar instructions includes a series of store instructions, some of which occur prior to a condition test being performed to determine whether to exit the loop, and some of which occur after that condition test. In the example sequence illustrated, the loop goes through three complete iterations 200, 205, 210, and then the condition test is evaluated as indicating that the loop should end at point 220 part way through the fourth iteration 215. It is often the case that the condition test is such that the number of iterations required is not known, and hence whilst in the example the loop terminates part way through the fourth iteration, it might in other instances not terminate until many more iterations have been performed, or indeed may terminate earlier.

When performing speculative vector operations in order to vectorise such a scalar loop, each scalar store instruction is replaced by a vector store instruction, where the specified vector operand comprises a plurality of vector elements, each vector element relating to a different iteration. Since it is not known which iteration the scalar loop will exit on, the loop cannot be vectorised by specifying vector operands having a specific number of vector elements. Instead, as shown in FIG. 6, for the equivalent vector store instructions to the scalar store instructions that occurred prior to the condition test, a speculation width is used to speculate as to the number of vector elements required. As discussed earlier, in one embodiment this speculation width with initially be set to 8, and accordingly performance of each of these vector store instructions will initially be replicating the performance of the equivalent store instruction eight times (i.e. one time across each of 8 separate iterations). If the number of vector store instructions occurring prior to the condition test/commit point is such that the buffer has insufficient space to store all of the write vectors, then as discussed earlier the speculation width will be reduced accordingly so that at least one vector element from each write vector can be stored in the buffer.

When the condition test is subsequently evaluated, it can then be determined how many vector elements are required. For example, it may be evaluated that the equivalent scalar loop would have ended on the third iteration, and hence the required speculation width was four (since in the original scalar loop, the instructions towards the top of the loop execute four times, whilst those after the condition test execute only three times, and hence the speculative code at the top of the equivalent vector loop must process at least four elements whilst the non-speculative code at the bottom of the loop must process three elements). Assuming the speculation width is still larger than at least four, then all of the required write data will be stored in the buffer, and during the commit process all of the required data can be stored out to the data store. However, if the current speculation width is less than the number of iterations indicated by the condition test, then the data that is in the buffer can be committed, but it will be required subsequently to perform at least one further iteration of the sequence of vector stores.

Following the commit point, then the remaining vector store instructions are perform non-speculatively. However, having regards to the identified width during the condition test analysis, a mask can be set to ensure that only the required number of vector elements are stored out to the data store. The process will then conditionally exit. In particular, if the condition test indicates that all of the required data has been written, the process will exit, whereas otherwise the process will be repeated at least one further time.

Figure 7:
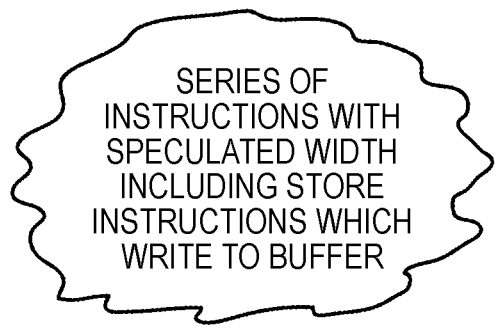
Figure 7:
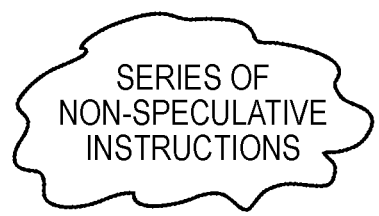

FIG. 7 illustrates a vector loop for a situation where specific speculate and commit instructions are used. The speculate instruction is used to turn on speculation, and hence set the speculation flag 72. Thereafter a series of instructions are executed speculatively with the speculation width 70 being used to identify the number of vector elements in each vector operand. These instructions will include one or more store instructions as discussed earlier, and will result in the vector elements being written into the buffer. As also discussed earlier, the buffer will be reconfigured dynamically as required to ensure that at least one vector element from each write vector is stored within the buffer. Thereafter, one or more instructions will be executed to determine the appropriate width to commit to the data store, and thereafter a separate commit instruction will be executed to cause the contents of the buffer to be stored into memory and speculation to be turned off. Following this, a series of non-speculative instructions will be executed, and as discussed earlier a mask or length value can be used in association with those instructions to set the vector element width appropriately having regards to the determination made prior to the commit point. A branch instruction can then be used in order to determine whether the loop should be repeated, or the loop should exit.

Figure 8A:
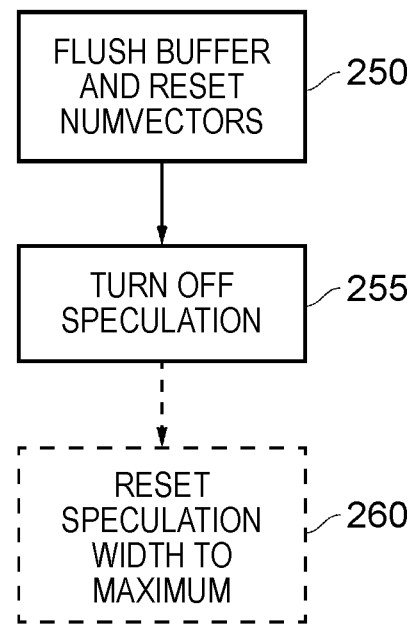
FIG. 8A illustrates a series of steps performed in response to a commit instruction in accordance with one embodiment.

FIG. 8A is a flow diagram illustrating steps performed when executing the commit instruction. In one embodiment, when the decode circuitry 20 decodes the commit instruction, it sends control signals to the speculation control circuitry 60. This will cause the speculation control circuitry 60 to instruct the buffer to flush its buffer contents at step 250. As the buffer contents are flushed, i.e. each of the active vector elements is written out to the data store, the numvectors indication maintained by the speculation control circuitry will be reduced, such that by the time all of the active elements have been flushed, the numvectors indication 74 will be reset to zero.

At step 255, speculation is then turned off such that any subsequent instructions are performed non-speculatively until speculation is turned back on. In one embodiment, the commit instruction's execution can also be caused to reset the speculation width to the maximum value at step 260.

Figure 8B:
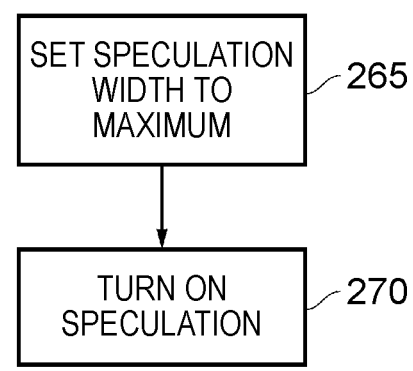
FIG. 8B illustrates a series of steps performed in response to a start speculation instruction in accordance with one embodiment.

FIG. 8B is a flow diagram schematically illustrating steps performed when executing the start speculation instruction. When the decode circuitry 20 decodes the start speculation instruction, it sends control signals to the speculation control circuitry 60, which in one embodiment causes the speculation width to be set to the maximum value 265, whereafter at step 270 speculation is turned on. It will be appreciated that if the start speculation instruction is used to turn on speculation, then there is no need for the commit instruction to reset the speculation width at step 260, since this is the step undertaken by the start speculation instruction at step 265. However, in alternative embodiments, there may be no need for an explicit start speculation instruction. For example, as discussed earlier, the instruction set may include speculative and non-speculative versions of certain instructions, including vector write instructions, and hence speculation may be turned on and off dependent on the actual instructions appearing in the instruction queue. In such embodiments, the commit instruction may still be used to cause the contents of the buffer to be flushed and speculation to be turned off, and in such situations it may be useful to use the commit instruction to reset the speculation width to the maximum.

Figure 9:
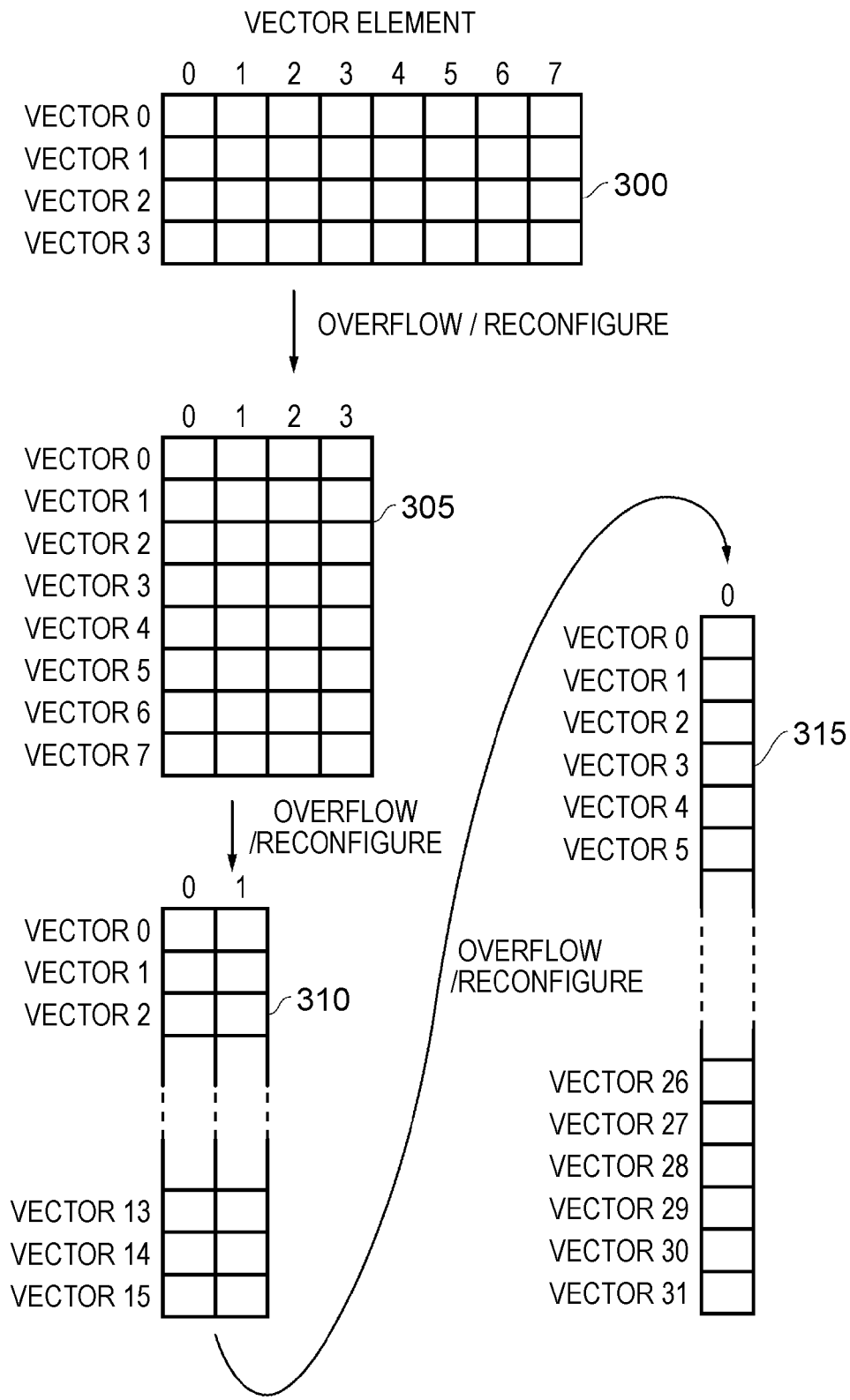
FIG. 9 schematically illustrates the reconfiguration of the buffer of FIG. 1 in response to detection of an overflow condition, in accordance with one embodiment.

FIG. 9 schematically illustrates how the buffer may be reconfigured in response to iterative occurrences of the overflow condition. In this example, it is assumed that the buffer 54 can hold 32 vector elements, and is originally configured as shown by item 300 in FIG. 9 to be able to store up to 4 vectors each comprising 8 vector elements. On occurrence of the overflow condition, the speculation control circuitry adjusts the speculation width to 4, this causing the buffer to be reconfigured as shown by element 305 in FIG. 9, so it can now hold up to 8 vectors of 4 vector elements each.

If a further overflow condition is detected (i.e. more than 8 write vectors need to be maintained prior to the commit point), then the speculation control circuitry 60 reduces the speculation width to 2, causing the buffer to be reconfigured as shown by element 310 in FIG. 9 so as to store up to 16 vectors, each of 2 vector elements. Finally, if a further overflow condition is detected, the speculation control circuitry 60 reduces the speculation width to 1, causing the buffer to take the form 315 shown in FIG. 9 where it can store up to 32 vectors, each having one vector element.

In one embodiment, the vector load/store unit 50 is also configured to support execution of speculative vector load instructions. Whilst it is safe to store the read data obtained by such load operations directly into the vector register bank 40, since in the event of over speculation it is possible to take corrective action to correct the contents of the vector register bank 40, it may be desirable to check for hazard conditions between the vector read operations and the vector write operations (also referred to as detecting memory dependencies). In accordance with one embodiment as illustrated in FIG. 10, the need to add further instructions to test for such memory dependencies is removed by modifying the buffer 54 to also keep certain information about the speculative read operations being performed, with an address comparator circuit 350 then being provided within the vector load/store unit 50 to perform address comparisons between address information maintained in the buffer and the addresses of vector elements being subjected to speculative read or speculative write operations.

Figure 10:
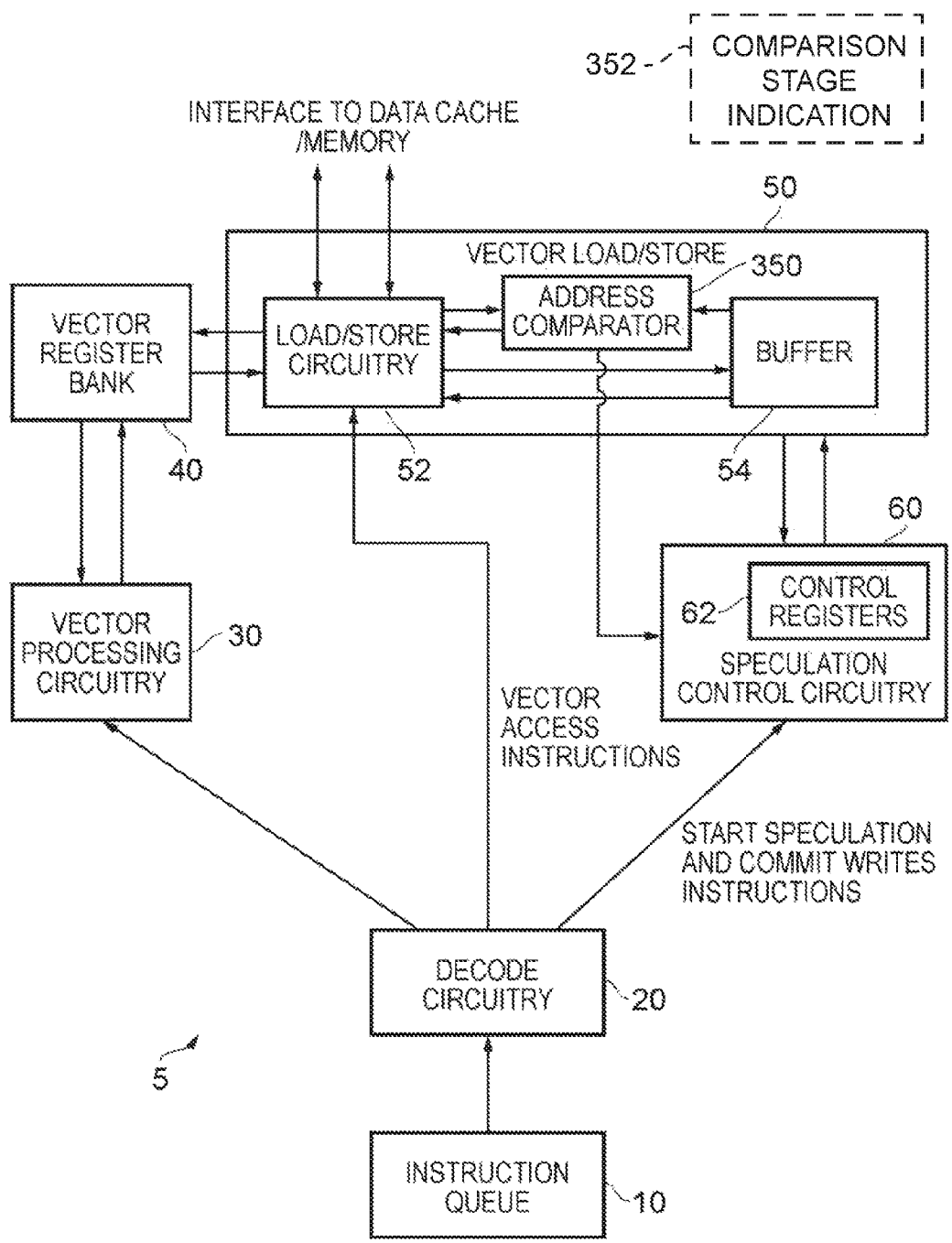
FIG. 10 schematically illustrates a data processing apparatus in accordance with an alternative embodiment.
Figure 11:
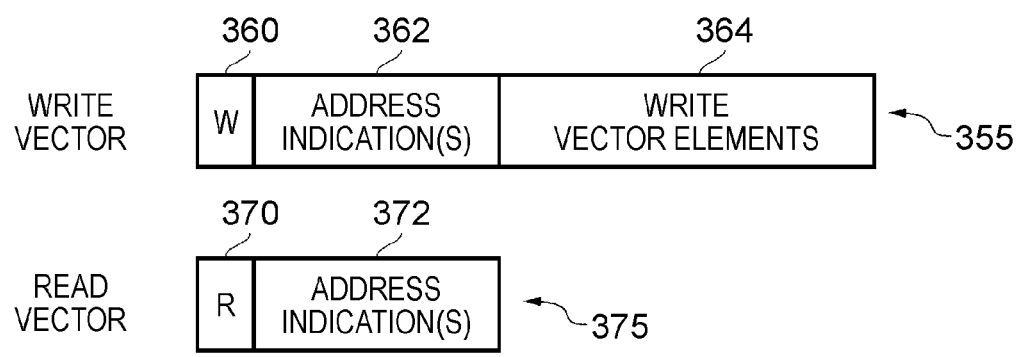
FIG. 11 schematically illustrates the contents of the buffer of FIG. 10 in accordance with one embodiment, and in particular the information stored within the buffer in relation to write vectors and read vectors associated with speculative write and read operations.

FIG. 11 schematically illustrates the information held in the buffer 54 when using the approach of FIG. 10. For each write vector held in the buffer 54, address indication information 362 is held in addition to the relevant write vector elements 364, the address indication data being sufficient to identify the addresses associated with each of the vector elements in the associated write vector. Further, the entry 355 in the buffer associated with the write vector also includes a flag 360 which is set to identify that that entry relates to a write vector. In addition, an entry 375 is also made in relation to each speculative read operation performed. Whilst there is no need to store the actual read vector data in the buffer, the address indication information 372 is stored in the buffer, and the flag 370 is set to identify that the address indication relates to a read vector.

Figure 12:
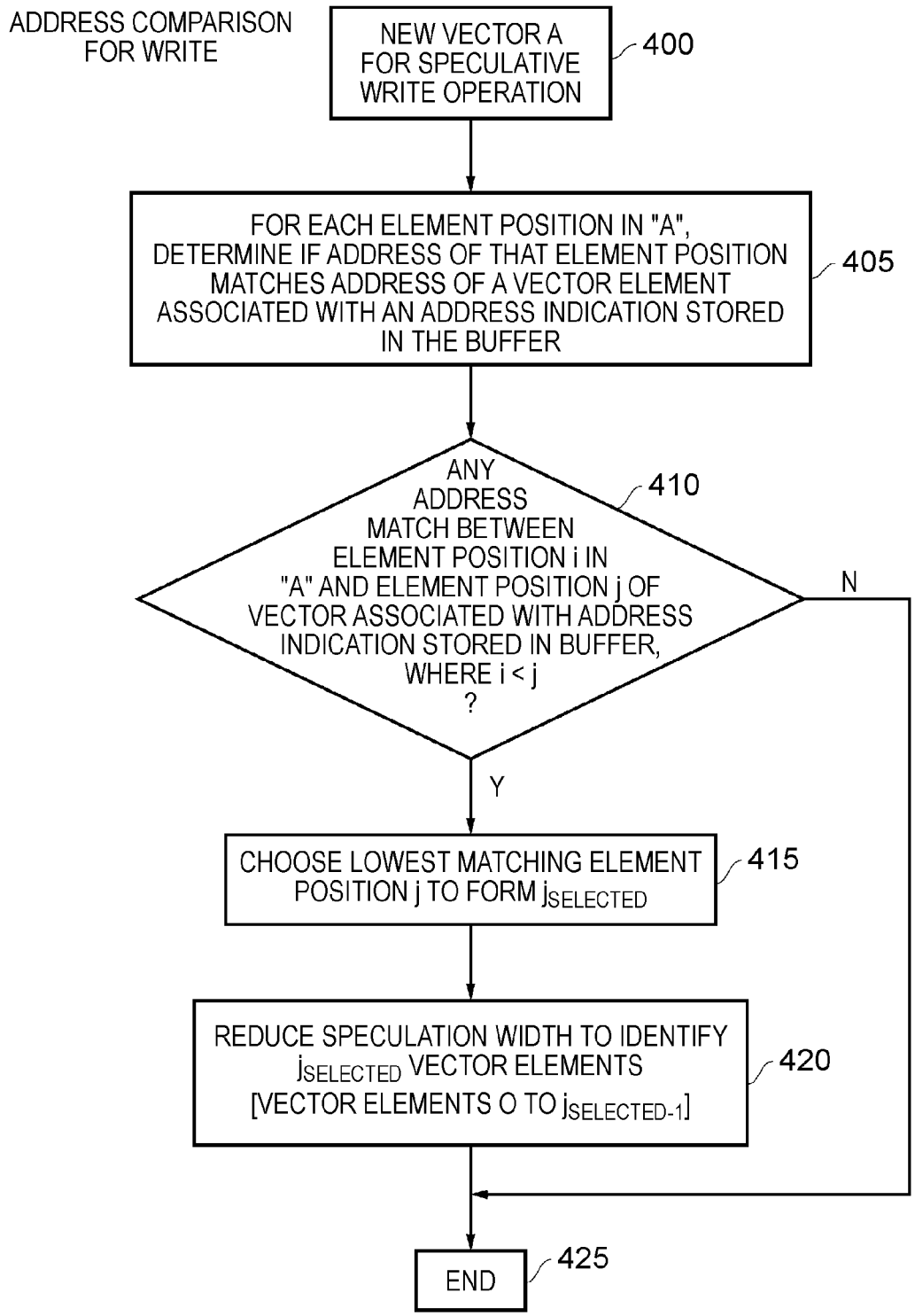
FIG. 12 is a flow diagram illustrating the operation of the address comparator circuitry of FIG. 10 when processing a current speculative write operation.

FIG. 12 is a flow diagram illustrating how the address comparator circuitry 350 is then used when performing write operations. At step 400 a new vector A is to be subjected to a speculative write operation by the vector load/store unit 50. At step 405, for each element position in the vector A, the address comparator circuitry 350 is arranged to determine if the address for that element position matches the address of any vector element associated with an address indication stored in the buffer. Whilst the address comparator may perform the comparison for all of the address indications stored in the buffer, in one embodiment for any particular element position in vector A being considered, the address comparator may constrict its comparison to evaluating address indication data associated with higher element positions of the vectors identified within the buffer 54. At step 410, it is determined whether there is any address match between an element position i in the vector A and an element position j of a vector associated within an address indication stored in the buffer, in a situation where i is less than j. In this situation, this indicates that the current speculative write operation is seeking to perform a write operation in respect of a particular element position where the address matches a more speculative write or read operation performed by a preceding vector data access operation.

To remove this potential memory dependency hazard, at step 415 the lowest matching element position j is chosen to form the parameter $j_{SELECTED}$. Hence, if there is only a single match, then the matching element position j is selected as $j_{SELECTED}$. Similarly, if there is more than one match detected, then the lowest element position j that resulted in a match forms $j_{SELECTED}$.

Thereafter, at step 420, the speculation width is reduced to identify $j_{SELECTED}$ vector elements. Assuming the first vector element is vector element zero, this means that each of the vectors associated with an entry in the buffer will now contain vector elements 0 to $j_{SELECTED-1}$. Thereafter the process ends at step 425. If at step 410 there were no matches detected, then the process proceeds directly from step 410 to step 425, where the process ends. It will be appreciated that the process described in FIG. 12 can be accomplished in other ways. For example, the process could be performed by sequentially testing addresses of elements in increasing element position, and terminating on finding the first match.

Figure 13:
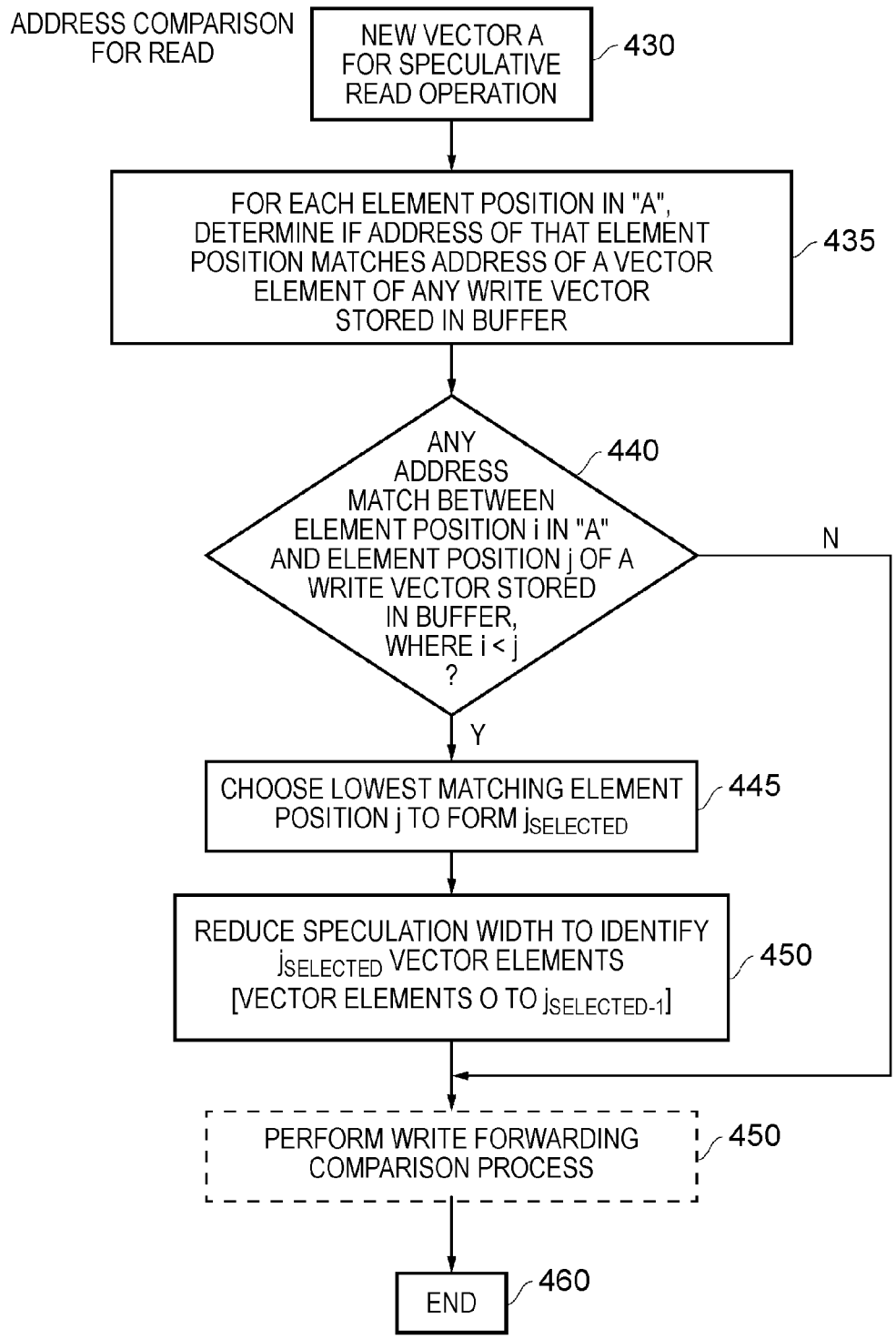
FIG. 13 is a flow diagram illustrating the operation of the address comparator circuitry of FIG. 10 when processing a current speculative read operation.

FIG. 13 is a flow diagram illustrating how the address comparator is used when the current speculative data access operation is a speculative read operation. At step 430, a new vector A is identified which is to be subjected to a speculative read operation by the load/store unit 50. At step 435, for each element position in the vector A it is determined if the address of that element position matches the address of a vector element of any write vector stored in the buffer. Since the current speculative access is a read access, it is not necessary to compare with addresses of other read vectors identified in the buffer, and instead the comparisons can be restricted to those entries related to write vectors.

At step 440, it is determined if there is any address match between an element position i in vector A and an element position j of a write vector stored in the buffer, in a situation where i is less than j.

If so, then as with the earlier described FIG. 12, the lowest matching element position j is chosen to form the parameter $j_{SELECTED}$ at step 445 and then at step 450 the speculation width is reduced to identify $j_{SELECTED}$ vector elements.

The process then proceeds optionally through a write forwarding comparison process 450 prior to the process ending at step 460. If no match is detected at step 440 the process proceeds directly to steps 450, 460.

When performing speculative read operations, there is a possibility that the speculative read operation may be seeking to read data from an address which is associated with a vector element of a write vector still stored in the buffer 54, and not yet committed to the data store. In one embodiment, such situations can be detected by using the address comparator 350 to perform the process shown in FIG. 14. The address comparator 350 can be used in this manner even if the address comparator is not used to perform the speculation width reduction mechanism described with reference to FIG. 13. Alternatively the comparison circuitry can be arranged to perform both processes, such that the process of FIG. 14 implements the step 450 of FIG. 13.

Figure 14:
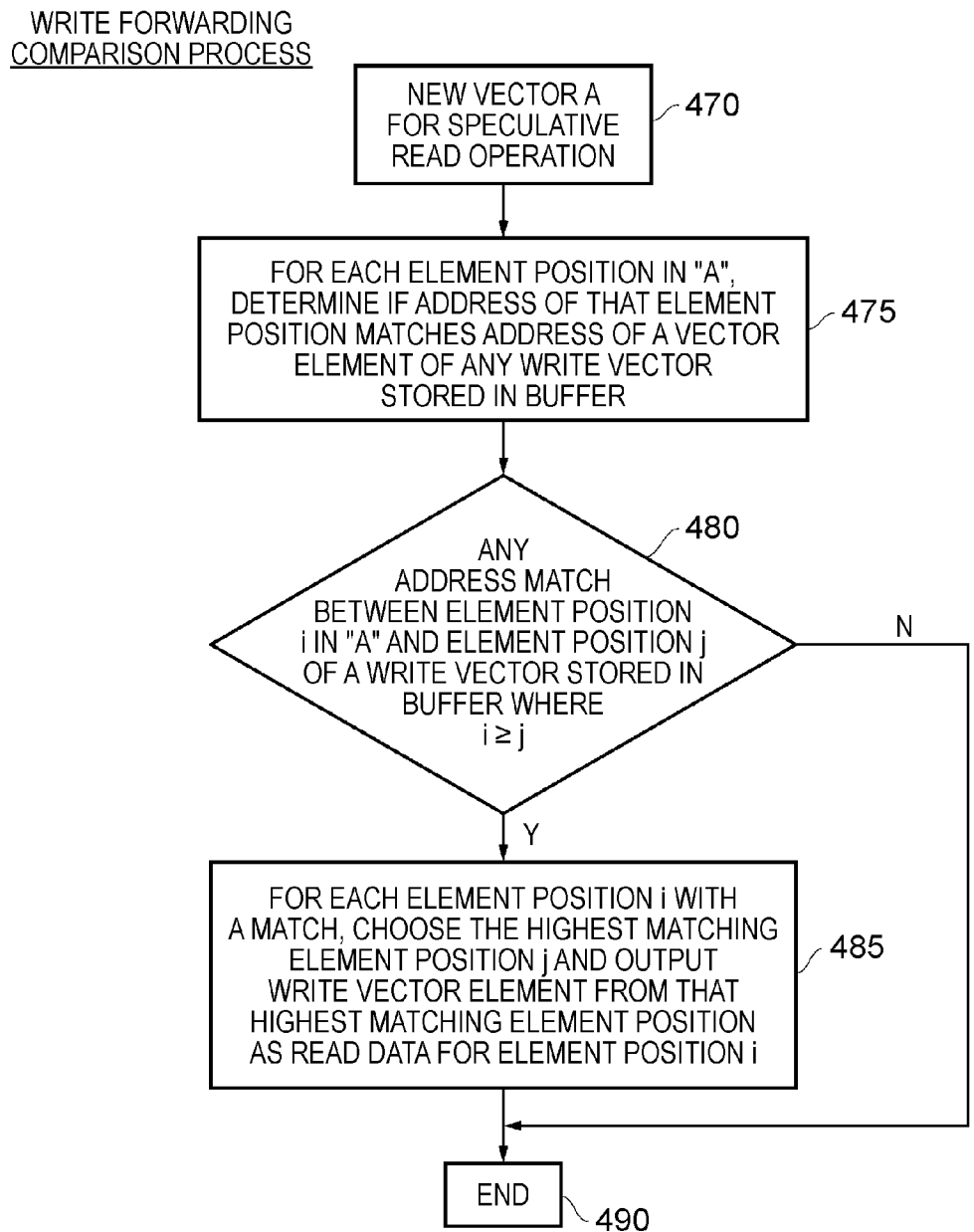
FIG. 14 schematically illustrates a write forwarding mechanism that may be employed within the circuitry of FIG. 10 when processing a current speculative read operation, in accordance with one embodiment.

Steps 470 and 475 of FIG. 14 correspond to steps 430 and 435 of FIG. 13, and if the processes of both FIGS. 13 and 14 are being performed, there is no need for FIG. 14 to repeat steps 470 and 475, and instead the results from step 435 can be used directly at step 480 in FIG. 14.

At step 480, it is determined whether there is any address match between an element position i in the vector A and an element position j of a write vector stored in the buffer, in a situation where i is greater than or equal to j. This indicates a situation where the current speculative read operation is seeking to read data from an address that will have been written to by an earlier write vector once that write vector has been committed to the data store.

In that event, the process proceeds to step 485, where for each element position i within the vector A for which a match is determined, the highest matching element position j is selected and the write vector element from that highest matching element position is then output as the read data for element position i of the current speculative read operation. By outputting the highest matching element position j (for situations where i is greater than or equal to j), this will ensure that the most up to date data is provided as the read data for element position i.

Following step 485, the process ends at step 490, or indeed the process proceeds to step 490 from step 480 if no matches are detected.

Figure 15A:
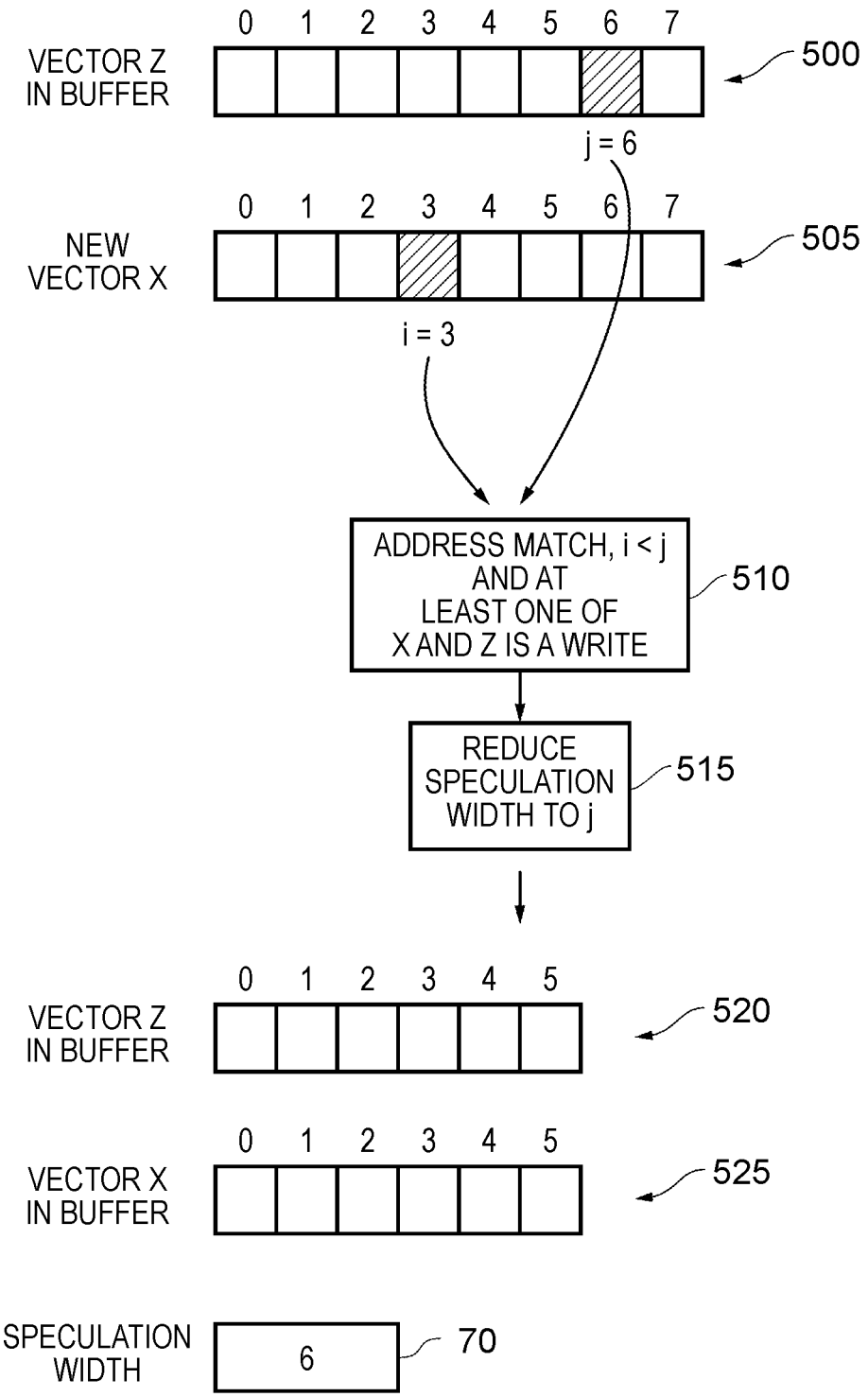
FIGS. 15A to 15C schematically illustrate how speculation width may be reduced dependent on the output of the comparison operation performed by the address comparator circuitry of FIG. 10, in accordance with one embodiment.
Figure 15B:
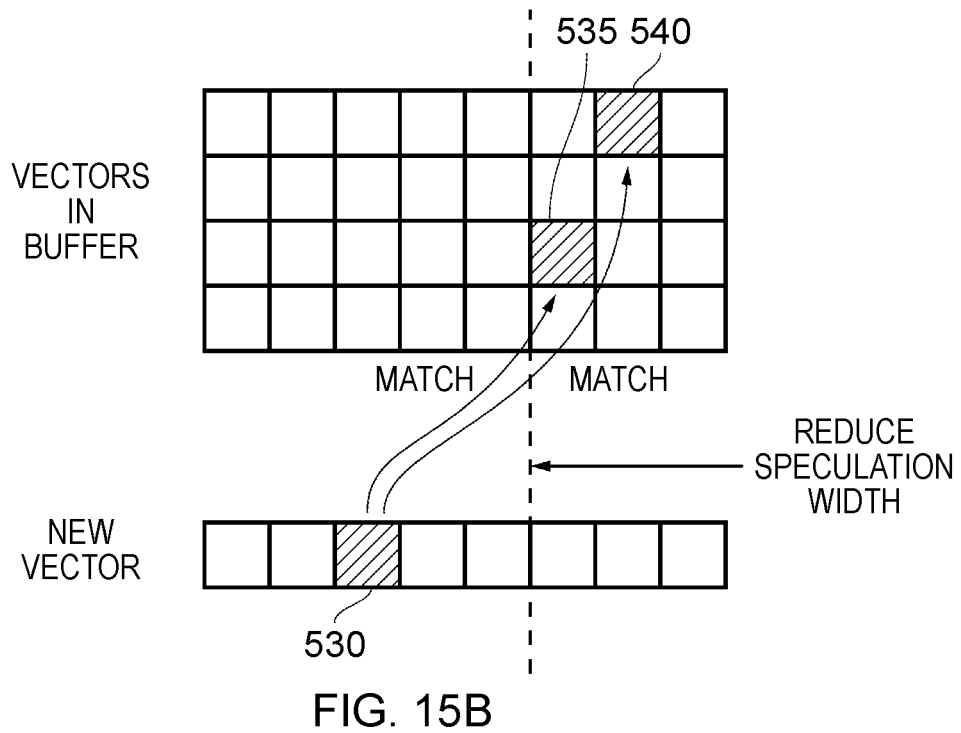
Figure 15C:
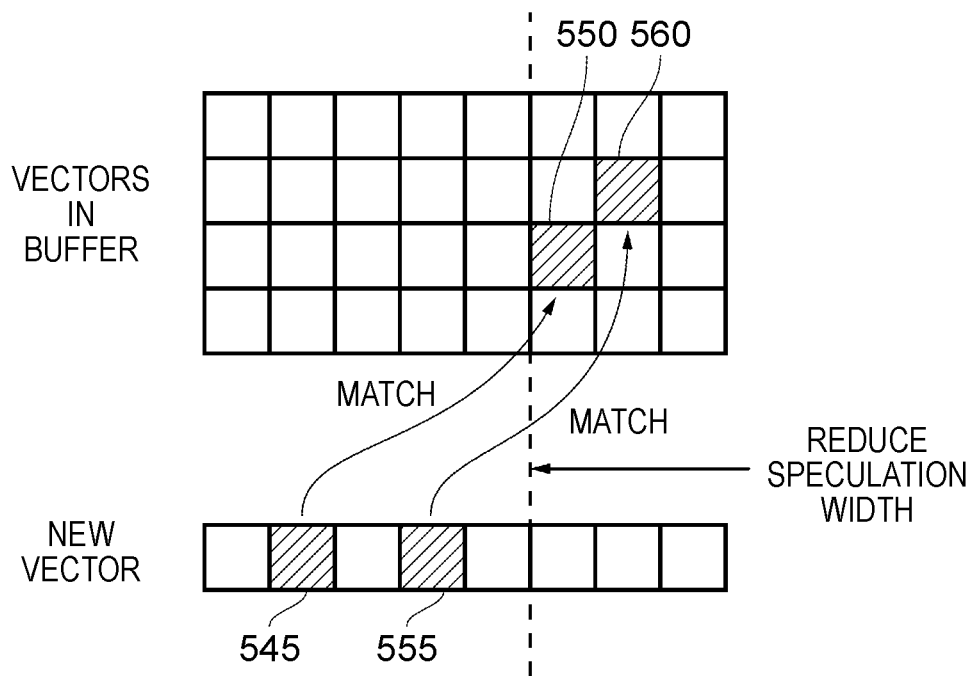

FIGS. 15A to 15C schematically illustrate how speculation width may be reduced dependent on the output of the comparison operation performed in accordance with FIG. 12 or 13. As shown in FIG. 15A, if a match between the address of element position 3 in the new vector 505 is detected with the address of the element position 6 in a vector 500 already identified in the buffer 54, then at step 510, if at least one of the new vector 505 and the vector 500 is a write vector, then the speculation width is reduced at step 515 and in particular is reduced to the value of j producing the match (i.e. in this instance 6). As a result the modified vectors are as shown by elements 525, 520 in FIG. 15A. In particular, the vector elements at element positions 6 and 7 are discarded. As shown in FIG. 15A, the speculation width indication 70 will be updated to identify the revised speculation width of six.

FIG. 15B illustrates what happens in the event of multiple matches with a single element position in the new vector, this being shown as element position 530 in FIG. 15B. If the address of this element position element matches with the addresses of both element positions 535 and 540 of vectors already held in the buffer, then the lowest matching element position, i.e. the element position 535 is selected and the speculation width is reduced based on that selected matching element position.

As shown in FIG. 15C, the same basic principal applies even if the multiple matching element positions relate to different element positions in the new vector. For example, if the address at element position 545 in the new vector matches the address at element position 550 of a vector in the buffer, and the address of element position 555 in the new vector matches the address of element position 560 already in the buffer, then the process still selects the lowest matching element position amongst the multiple matching element positions, and reduces the speculation width accordingly.

Figure 16A:
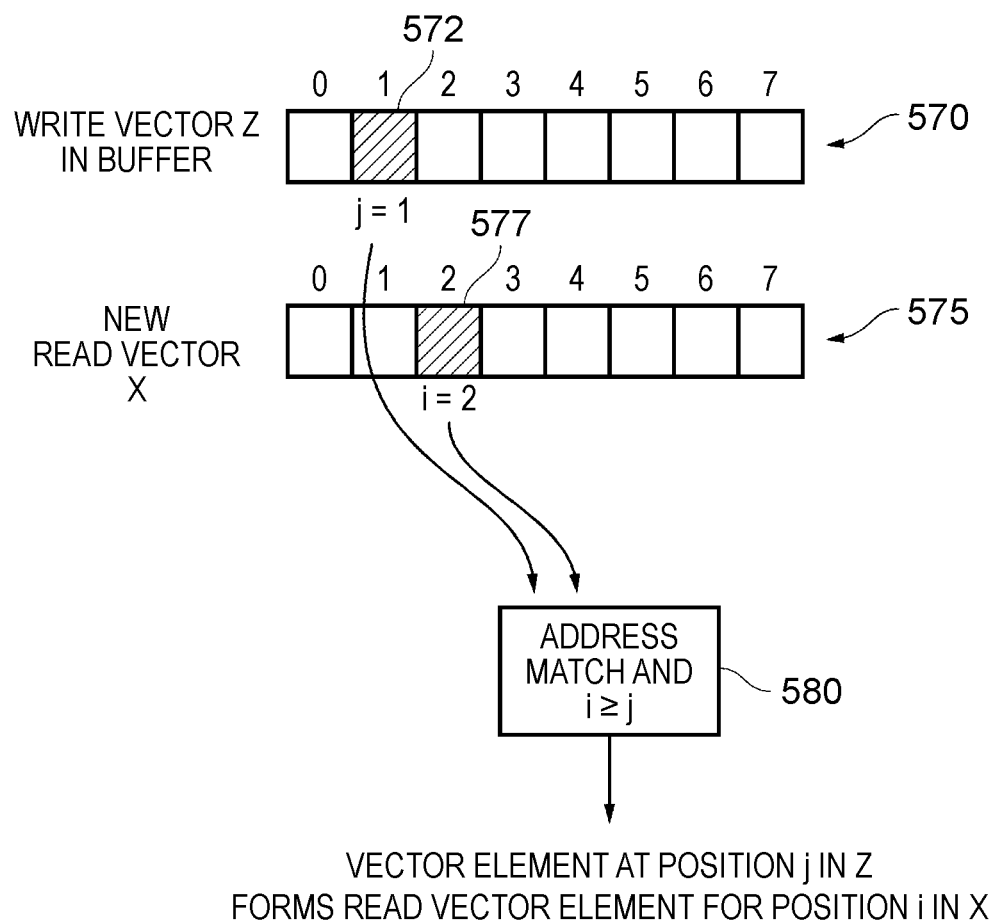
FIGS. 16A to 16C schematically illustrate the write forwarding mechanism of one embodiment.
Figure 16B:
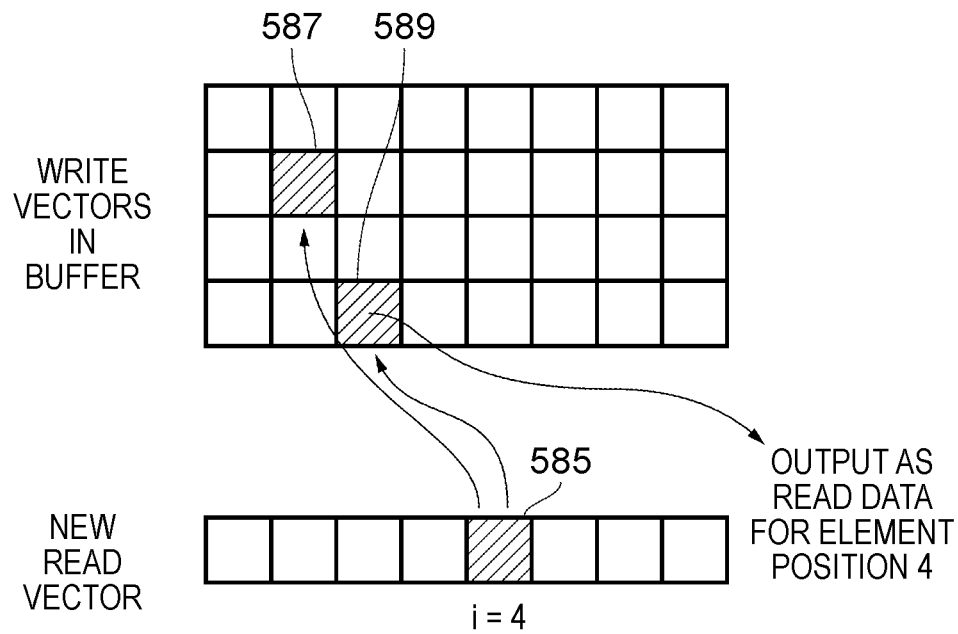
Figure 16C:
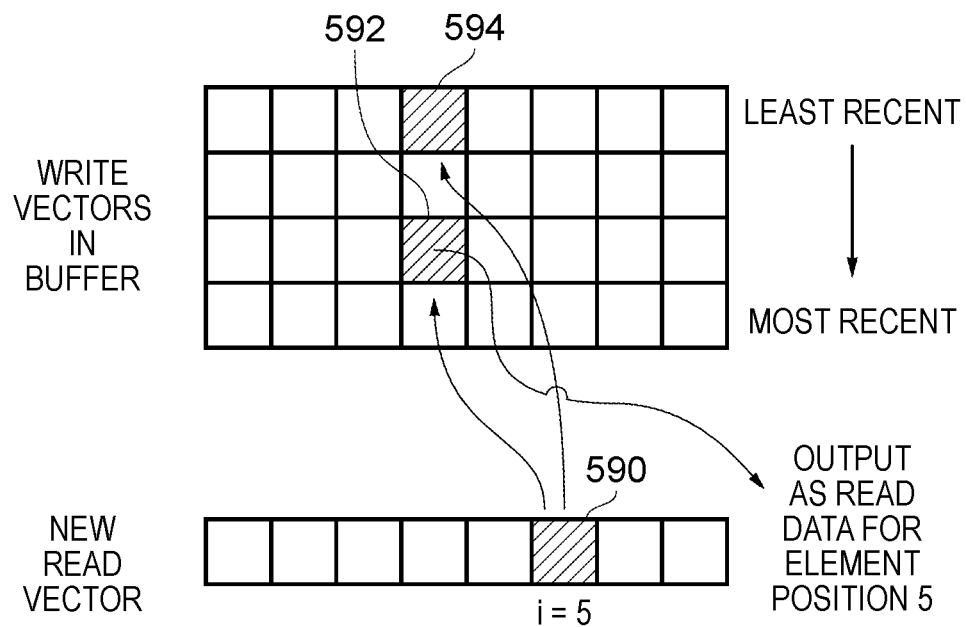

FIGS. 16A to 16C schematically illustrate the write forwarding mechanism discussed with reference to FIG. 14. If the address of element position 577 in the new vector 575 matches the address of element position 572 in a write vector 570 already stored in the write buffer, the new vector relating to a speculative read operation, then if at step 580 it is determined that i is greater than or equal to j, then the vector element at position j in the write vector Z forms the read vector element for position i in the new read vector X.

FIG. 16B illustrates what happens in the event of multiple matches with a particular element position in the read vector. In particular, the element position 585 has an address which matches both the address of element positions 587 and 589 in different write vectors within the buffer. In this instance, the matching vector having the highest element position is chosen as the one to be used as the read data for the element position 585 of the new read vector.

FIG. 16C illustrates what happens if the multiple matches within the buffer reside at the same element position. In this instance, the address of the vector element 590 in the new read vector matches the address of the vector elements 592, 594 in different write vectors of the buffer. However, the most recent write vector is that at the bottom of the buffer as shown in FIG. 16C, and accordingly in this instance the vector element 592 is chosen as the read data for the element position 590 of the new read vector, since this will represent the most up to date data.

Figure 17:
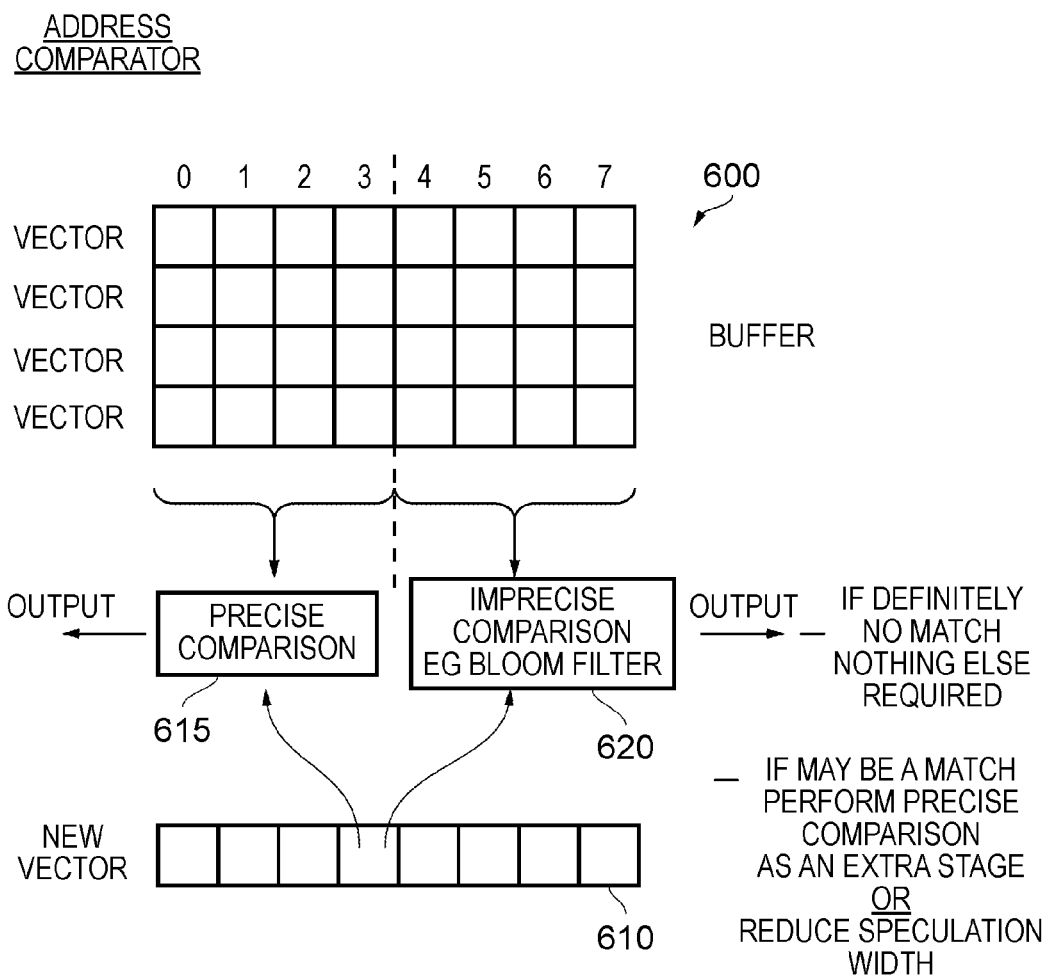
FIG. 17 schematically illustrates an arrangement of the address comparator circuitry of FIG. 10 in accordance with one embodiment.

Depending on the size of the buffer 54, the address comparator circuitry 350 may have a significant number of address comparisons to perform. Whilst precise address comparisons can be performed for every element position within the buffer, in one embodiment the address comparator can be used to perform precise comparisons for some of the element positions and imprecise comparisons for other element positions. For example, as shown in FIG. 17, in one embodiment the higher element positions within the buffer may be subjected to an imprecise comparison approach since they relate to a higher degree of speculation. In particular, as shown, when a new vector 610 is being considered, the address of an element position within that vector can be subjected to a precise comparison 615 when comparing its address against addresses of the lower element positions within the vector buffer, but instead be subjected to an imprecise comparison approach 620 when being compared against the addresses of higher element positions in the buffer.

It will be appreciated that there are a number of known imprecise comparison approaches known in the prior art. One possible mechanism is a Bloom filter mechanism, where a bit array is generated based on the address indication information for all of the element positions within a certain area of the buffer (in this example element positions 4 to 7 of every vector), and then the address of a current element position in the new vector 610 is used to generate an index into that bit array, with the output then being an indication that there is definitely not a match, or that instead there may be a match.

If there definitely is no match, then no further action is required. If there may be a match, then the action taken can be varied dependent on embodiment. For example, one possibility is merely to reduce the speculation width so as to remove all of the element positions for which there may be a match, and hence in the example of FIG. 17 this would involve reducing the speculation width from 8 to 4. An alternative may be to reuse the precise comparison circuitry in a subsequent step to perform a precise comparison based on the address indications of each element position in the upper half of the buffer. By such an approach, it is possible to reduce the volume of comparisons required to be performed by the comparator, and thereby increase performance. It should be noted that for embodiments that employ the write forwarding approach of FIG. 14, it will still be necessary to perform the exact comparisons in respect of each element position within the buffer that is less than or equal to the current element position of a new read vector being considered.

Whilst in one embodiment, the address comparison circuitry 350 may be required to perform the above discussed address comparisons for all speculative data access operations, in an alternative embodiment the speculative data access operations may have a comparison state indication 352 associated therewith, and the address comparisons performed by the address comparison circuitry is then dependent on that comparison state indication. A comparison state indication may be set globally or may be identified individually for each speculative data access operation.

In one embodiment, if the comparison state indication has a first value for the current speculative data access operation, the address comparison circuitry is configured to perform no address comparisons for that current speculative data access operation. Hence, if the programmer knows that a vector that is the subject of a speculative vector access operation cannot possibly have a matching address with any of the contents in the reconfigurable buffer, the state information can be set to the first value in order to cause the address comparison circuitry to be bypassed for that particular vector access operation.

Alternatively, if the reads and writes consist of one set A of reads/writes which might match each other, and a second set B of reads/writes that might match each other, then the reconfigurable buffer can maintain a flag in association with each vector to identify whether that vector relates to set A or set B, and then for a current speculative data access operation identified as either being relating to set A or set B, the number of address comparisons can be reduced, in particular the address comparison circuitry only comparing against the relevant vectors within the reconfigurable buffer.

Figure 18:
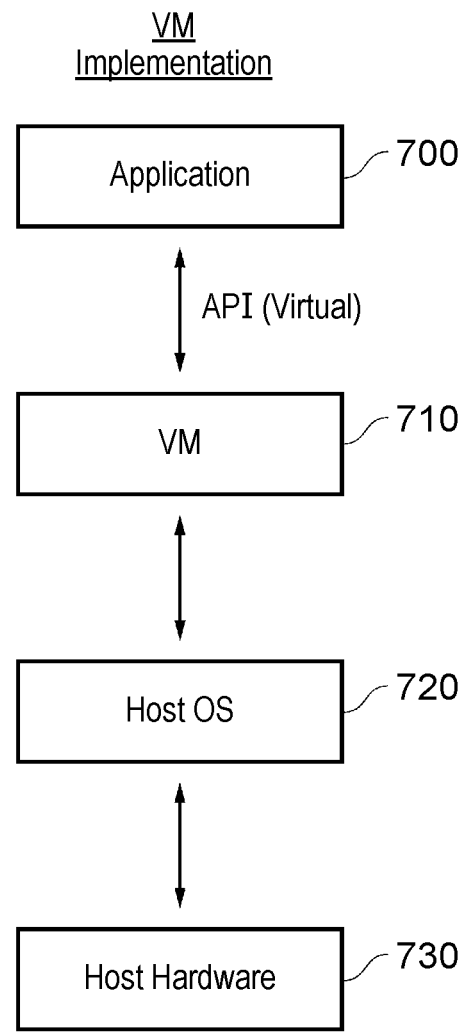
FIG. 18 schematically illustrates a virtual machine implementation of the data processing apparatus in accordance with one embodiment.

FIG. 18 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 730 typically running a host operating system 720 supporting a virtual machine program 710. Often, large powerful processors are required to provide virtual machine implementations which execute at a reasonable speed, but such an approach may be justified in certain circumstances, such as when there is a desire to run code native to another processor for compatibility or re-use reasons. The virtual machine program 710 is capable of executing an application program (or operating system) 700 to give the same results as would be given by execution of the program by such a real hardware device. Thus, the program instructions, including the speculative write and read instructions described above, may be executed from within the application program 700 using the virtual machine program 710.

From the above description of embodiments, it will be appreciated that such embodiments provide an efficient mechanism for implementing speculative vector write operations, hence enabling a wider variety of scalar programs to be vectorised. Further, the buffer used to support such speculative vector write operations can also be used to detect memory dependencies between speculative read operations and speculative write operations, and to take actions to remove hazards when performing such speculative processing. Further, the buffer can be used to support the forwarding of write data to read operations. Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a vector register bank configured to store vector operands for access by processing circuitry, each vector operand comprising a plurality of vector elements;
vector data access circuitry for performing vector access operations in order to move vector operands between the vector register bank and a data store;
a reconfigurable buffer accessible to the vector data access circuitry and comprising a storage array for storing up to M vectors of N vector elements, where the values of M and N are reconfigurable;
the vector data access circuitry being configured to perform speculative data write operations in order to cause vector elements from selected vector operands in the vector register bank to be stored into said reconfigurable buffer, on occurrence of a commit condition, the vector data access circuitry further being configured to cause the vector elements currently stored in the reconfigurable buffer to be written to the data store;

speculation control circuitry configured to maintain a speculation width indication indicating the number of vector elements of each selected vector operand stored in the reconfigurable buffer, the speculation width indication being initialised to an initial value, and on detection of an overflow condition within the reconfigurable buffer the speculation width indication being modified to reduce the number of vector elements of each selected vector operand stored in the reconfigurable buffer; and the reconfigurable buffer being responsive to a change in the speculation width indication to reconfigure the storage array to increase the number of vectors M and reduce the number of vector elements N per vector.

2. A data processing apparatus as claimed in claim 1, wherein the speculation control circuitry is responsive to execution of a start speculation instruction to trigger a speculative mode of operation during which the vector data access circuitry is configured to perform said speculative data write operations.

3. A data processing apparatus as claimed in claim 1, wherein the speculation control circuitry is responsive to execution of a commit instruction to indicate the occurrence of the commit condition to the vector data access circuitry and to terminate speculation.

4. A data processing apparatus as claimed in claim 3, wherein the speculation control circuitry is responsive to execution of one of said start speculation instruction and said commit instruction to initialise the speculation width indication to said initial value.

5. A data processing apparatus as claimed in claim 1, wherein if the speculation control circuitry is responsive to the overflow condition to modify the speculation width indication to indicate that only one vector element of each selected vector operand is to be stored in the reconfigurable buffer, the speculation control circuitry is configured to cause the vector data access circuitry to write to the data store the first vector element of each vector currently stored in the reconfigurable buffer.

6. A data processing apparatus as claimed in claim 5, wherein if the speculation control circuitry is responsive to the overflow condition to modify the speculation width indication to indicate that only one vector element of each vector operand is to be stored in the reconfigurable buffer, the speculation control circuitry is configured to terminate speculation.

7. A data processing apparatus as claimed in claim 6, wherein the vector data access circuitry is responsive to subsequent data write operations arising prior to occurrence of the commit condition to cause the first vector element of the selected vector operands to be written to the data store rather than into the reconfigurable buffer.

8. A data processing apparatus as claimed in claim 1, wherein for each speculative data write operation the first vector element of each selected vector operand is written to the data store rather than to the reconfigurable buffer, and any remaining vector elements indicated by the speculation width indication are stored into the reconfigurable buffer.

9. A data processing apparatus as claimed in claim 1, wherein each time the overflow condition is detected the speculation control circuitry is configured to modify the speculation width indication in order to reduce the number of vector elements N per vector by a factor of two.

10. A data processing apparatus as claimed in claim 1, wherein the reconfigurable buffer is arranged, on reconfiguring the storage array in response to a modified speculation width indication, to discard any vector elements in the reconfigurable buffer that lie outside the number of vector elements indicated by the modified speculation width.

11. A data processing apparatus as claimed in claim 1, wherein:
the vector data access circuitry is further configured to perform speculative data read operations in order to cause vector elements of selected vector operands to be read from said data store for storage in said vector register bank, the number of vector elements of each selected vector operand being dependent on said speculation width indication.

12. A data processing apparatus as claimed in claim 11, wherein:
the reconfigurable buffer is configured to store, for each speculative data write operation performed, the vector elements forming a write vector to be written and address indication data used to determine an address of each of said vector elements of the write vector, the reconfigurable buffer further being configured to store, for each speculative data read operation, address indication data used to identify an address for each vector element forming a read vector to be read by that speculative data read operation.

13. A data processing apparatus as claimed in claim 12, wherein each write vector and each read vector comprise element positions from an initial start position K to a position X, where K and X are dependent on the speculation width indication, the apparatus further comprising:
address comparison circuitry configured to determine whether an address of a first vector element associated with a current speculative data access operation matches an address of a second vector element associated with address indication data stored in the reconfigurable buffer;
in the event of said match being determined, and if at least one of the first vector element and the second vector element forms part of a write vector, and the second vector element is at a higher element position than the first vector element, the speculation control circuitry is configured to modify the speculation width indication to reduce the number of vector elements in each write vector and each read vector.

14. A data processing apparatus as claimed in claim 13, wherein if the second vector element is at element position j between element positions K and X, the speculation control circuitry is configured to modify the speculation width indication to reduce the number of vector elements in each write vector and each read vector to include vector element positions K to j-1.

15. A data processing apparatus as claimed in claim 13, wherein in the event of the address comparison circuitry determining that the address of a first vector element within a current speculative data access operation matches the address of multiple second vector elements associated with address indication data stored in the reconfigurable buffer, the address comparison circuitry is configured to determine as a matching second vector element the second vector element amongst said multiple second vector elements having the lowest element position, and the speculation control circuitry is configured to modify the speculation width indication having regard to the element position of the matching second vector element.

16. A data processing apparatus as claimed in claim 13, wherein if the current speculative data access operation is a current speculative data write operation, the address comparison circuitry is configured to compare the address indication data of the current speculative data write operation with each address indication data stored in the reconfigurable buffer in order to detect any matches between the addresses of the vector elements of the current speculative data write operation and the addresses of the vector elements of each write vector and each read vector identified by address indication data stored in the reconfigurable buffer.

17. A data processing apparatus as claimed in claim 13, wherein if the current speculative data access operation is a current speculative data read operation, the address comparison circuitry is configured to compare the address indication data of the current speculative data read operation with the address indication data of each write vector stored in the reconfigurable buffer in order to detect any matches between the addresses of the vector elements of the current speculative data read operation and the addresses of the vector elements of each write vector stored in the reconfigurable buffer.

18. A data processing apparatus as claimed in claim 1, wherein:
the vector data access circuitry is further configured to perform speculative data read operations in order to cause vector elements of selected vector operands to be read from said data store for storage in said vector register bank, the number of vector elements of each selected vector operand being dependent on said speculation width indication;
the reconfigurable buffer is configured to store, for each speculative data write operation performed, the vector elements forming a write vector to be written and address indication data used to determine an address of each of said vector elements of the write vector, the reconfigurable buffer further being configured to store, for each speculative data read operation, address indication data used to identify an address for each vector element forming a read vector to be read by that speculative data read operation;
each write vector and each read vector comprise element positions from an initial start position K to a position X, where K and X are dependent on the speculation width indication, the apparatus further comprising:
address comparison circuitry configured to determine whether an address of a first vector element associated with a current speculative data read operation matches an address of a third vector element of a write vector stored in the reconfigurable buffer; and
in the event of said match being determined, and if the third vector element is at a lower element position than the first vector element, or at the same element position as the first vector element, the address comparison circuitry is configured to output from the reconfigurable buffer the third vector element to form the first vector element of the read vector of the current speculative data read operation.

19. A data processing apparatus as claimed in claim 18, wherein in the event of the address comparison circuitry determining that the address of a first vector element within a current speculative data read operation matches the address of multiple third vector elements associated with write vectors stored in the reconfigurable buffer, the address comparison circuitry is configured to determine as a matching third vector element the third vector element amongst said multiple third vector elements having the highest element position, and the address comparison circuitry is configured to output from the reconfigurable buffer the matching third vector element to form the first vector element of the read vector of the current speculative data read operation.

20. A data processing apparatus as claimed in claim 19, wherein in the presence of more than one of said multiple third vector elements having the highest element position, the address comparison circuitry is configured to determine as said matching third vector element the third vector element amongst said more than one of multiple third vector elements relating to the most recent speculative data write operation.

21. A data processing apparatus as claimed claim 13, wherein the address comparison circuitry comprises a precise comparison section and an approximate comparison section, the approximate comparison section being used for performing comparisons in respect of the addresses of element positions higher than a selected element position.

22. A data processing apparatus as claimed in claim 21, wherein said approximate comparison section comprises Bloom filter circuitry.

23. A data processing apparatus as claimed claim 13, wherein the speculative data access operations have a comparison state indication associated therewith, and the address comparisons performed by the address comparison circuitry are dependent on said comparison state indication.

24. A data processing apparatus as claimed in claim 23, wherein if the comparison state indication has a first value for the current speculative data access operation, the address comparison circuitry is configured to perform no address comparisons for that current speculative data access operation.

25. A data processing apparatus as claimed in claim 1, wherein said speculation width indication further identifies a first vector element of each vector operand to be subjected to said speculative data write operations.

26. A data processing apparatus as claimed in claim 25, wherein said speculation width indication identifies the number of vector elements of each vector operand to be subjected to said speculative data write operations as being a specified number of sequential vector elements starting from said first vector element.

27. A method of performing speculative vector write operations in a data processing apparatus comprising a vector register bank for storing vector operands for access by processing circuitry, each vector operand comprising a plurality of vector elements, and vector data access circuitry for performing vector access operations in order to move vector operands between the vector register bank and a data store, the method comprising:
providing a reconfigurable buffer accessible to the vector data access circuitry and comprising a storage array for storing up to M vectors of N vector elements, where the values of M and N are reconfigurable;
using the vector data access circuitry to perform speculative data write operations in order to cause vector elements from selected vector operands in the vector register bank to be stored into said reconfigurable buffer;
on occurrence of a commit condition, causing the vector elements currently stored in the reconfigurable buffer to be written to the data store;
maintaining a speculation width indication indicating the number of vector elements of each selected vector operand stored in the reconfigurable buffer, the speculation width indication being initialised to an initial value;

on detection of an overflow condition within the reconfigurable buffer, modifying the speculation width indication to reduce the number of vector elements of each selected vector operand stored in the reconfigurable buffer; and responsive to a change in the speculation width indication, reconfiguring the storage array of the reconfigurable buffer to increase the number of vectors M and reduce the number of vector elements N per vector.

28. A computer program product storing in a non-transitory form a computer program for controlling a computer to provide a virtual machine execution environment for program instructions corresponding to a data processing apparatus as claimed in claim 1.

29. A data processing apparatus comprising:

vector register bank means for storing vector operands for access by processing means, each vector operand comprising a plurality of vector elements;

vector data access means for performing vector access operations in order to move vector operands between the vector register bank means and a data store means;

reconfigurable buffer means for access by the vector data access means and comprising a storage array means for storing up to M vectors of N vector elements, where the values of M and N are reconfigurable;

the vector data access means for performing speculative data write operations in order to cause vector elements from selected vector operands in the vector register bank means to be stored into said reconfigurable buffer means, on occurrence of a commit condition, the vector data access means for causing the vector elements currently stored in the reconfigurable buffer means to be written to the data store means;

speculation control means for maintaining a speculation width indication indicating the number of vector elements of each selected vector operand stored in the reconfigurable buffer means, the speculation width indication being initialised to an initial value, and on detection of an overflow condition within the reconfigurable buffer means the speculation width indication being modified to reduce the number of vector elements of each selected vector operand stored in the reconfigurable buffer means; and the reconfigurable buffer means being responsive to a change in the speculation width indication to reconfigure the storage array means to increase the number of vectors M and reduce the number of vector elements N per vector.

\* \* \* \* \*